(12) United States Patent
Jang et al.

(10) Patent No.: US 11,966,119 B2
(45) Date of Patent: Apr. 23, 2024

(54) OPTICAL FILM, DISPLAY PANEL AND DISPLAY DEVICE INCLUDING THE SAME

(71) Applicant: Samsung Display Co., LTD., Yongin-si (KR)

(72) Inventors: Hye Lim Jang, Yongin-si (KR); Young Gu Kim, Yongin-si (KR); Ji Yun Park, Yongin-si (KR); Jong Ho Son, Yongin-si (KR); Jong Min Ok, Yongin-si (KR); Sun Young Chang, Yongin-si (KR); Baek Kyun Jeon, Yongin-si (KR); Kyung Seon Tak, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 63 days.

(21) Appl. No.: 17/005,313

(22) Filed: Aug. 28, 2020

(65) Prior Publication Data

US 2021/0072600 A1 Mar. 11, 2021

(30) Foreign Application Priority Data

Sep. 11, 2019 (KR) .......................... 10-2019-0112782

(51) Int. Cl.
*G02F 1/1337* (2006.01)
*G02B 5/30* (2006.01)
(Continued)

(52) U.S. Cl.
CPC .......... *G02F 1/133711* (2013.01); *G02B 5/30* (2013.01); *G02F 1/133308* (2013.01); *G02F 1/133514* (2013.01); *G02B 1/007* (2013.01)

(58) Field of Classification Search
CPC ......... G02F 1/133711; G02F 1/133308; G02F 1/133514; G02F 1/133502;
(Continued)

(56) References Cited

U.S. PATENT DOCUMENTS 6,322,236 B1 * 11/2001 Campbell ............ G02B 6/0043
362/333
8,158,337 B2 4/2012 Hwang et al.
(Continued)

FOREIGN PATENT DOCUMENTS

EP 1959275 8/2008
JP 2008003245 * 6/2006
(Continued)

OTHER PUBLICATIONS

EP Provisional Opinion Accompaying The Partial Search Result for EP 20 193 037.7 dated Feb. 8, 2021.
Partial Search Report EP 20 19 3037 dated Jan. 28, 2021.

*Primary Examiner* — Michael H Caley
*Assistant Examiner* — Agnes Dobrowolski
(74) *Attorney, Agent, or Firm* — H.C. Park & Associates, PLC

(57) ABSTRACT

An optical film for a display device, includes: a first refractive layer having an upper surface and a lower surface including first projections and second projections extending away from the lower surface in a first direction, the second projections having different heights than the first projections, the first projections having lateral sides with different angles of inclination that decrease in the first direction; and a second refractive layer disposed directly on the upper surface of the first refractive layer, the second refractive layer having a refractive index different from that of the first refractive layer.

22 Claims, 23 Drawing Sheets

(51) Int. Cl.
  *G02F 1/1333* (2006.01)
  *G02F 1/1335* (2006.01)
  *G02B 1/00* (2006.01)
(58) Field of Classification Search
  CPC ......... G02F 1/133526; G02F 1/133753; G02F 1/133; G02F 1/133607; G02B 5/30; G02B 1/007; G02B 5/0231; G02B 5/0268; G02B 5/0278; G02B 5/0215; G02B 1/10; G02B 3/0062; H01L 27/3232; H01L 27/3244
  See application file for complete search history.

(56) References Cited

U.S. PATENT DOCUMENTS

| | | | |
|---|---|---|---|
| 9,224,984 B2 | 12/2015 | Shim et al. | |
| 9,507,059 B2 | 11/2016 | Shim et al. | |
| 10,775,539 B2 | 9/2020 | Lee et al. | |
| 2007/0041701 A1* | 2/2007 | Yang | G02B 6/0053 385/146 |
| 2009/0256997 A1 | 10/2009 | Misono et al. | |
| 2013/0003389 A1* | 1/2013 | Moroishi | C08G 18/6237 156/292 |
| 2014/0353618 A1 | 12/2014 | Shim et al. | |
| 2016/0187682 A1* | 6/2016 | Oh | G02B 5/045 349/96 |
| 2016/0187699 A1* | 6/2016 | Ju | G02F 1/133504 349/96 |
| 2016/0274275 A1 | 9/2016 | Kim et al. | |
| 2017/0184780 A1* | 6/2017 | Notermans | G02B 6/005 |
| 2018/0045876 A1 | 2/2018 | Lee et al. | |
| 2018/0095215 A1* | 4/2018 | Kim | G02B 6/0036 |
| 2019/0163023 A1 | 5/2019 | Park et al. | |
| 2019/0212607 A1* | 7/2019 | Tien | G02B 5/0236 |

FOREIGN PATENT DOCUMENTS

| | | |
|---|---|---|
| KR | 10-0563472 | 3/2006 |
| KR | 10-2015-0057461 | 5/2015 |
| KR | 10-1616918 | 4/2016 |
| KR | 10-1659241 | 9/2016 |
| KR | 10-2019-0062647 | 6/2019 |

* cited by examiner

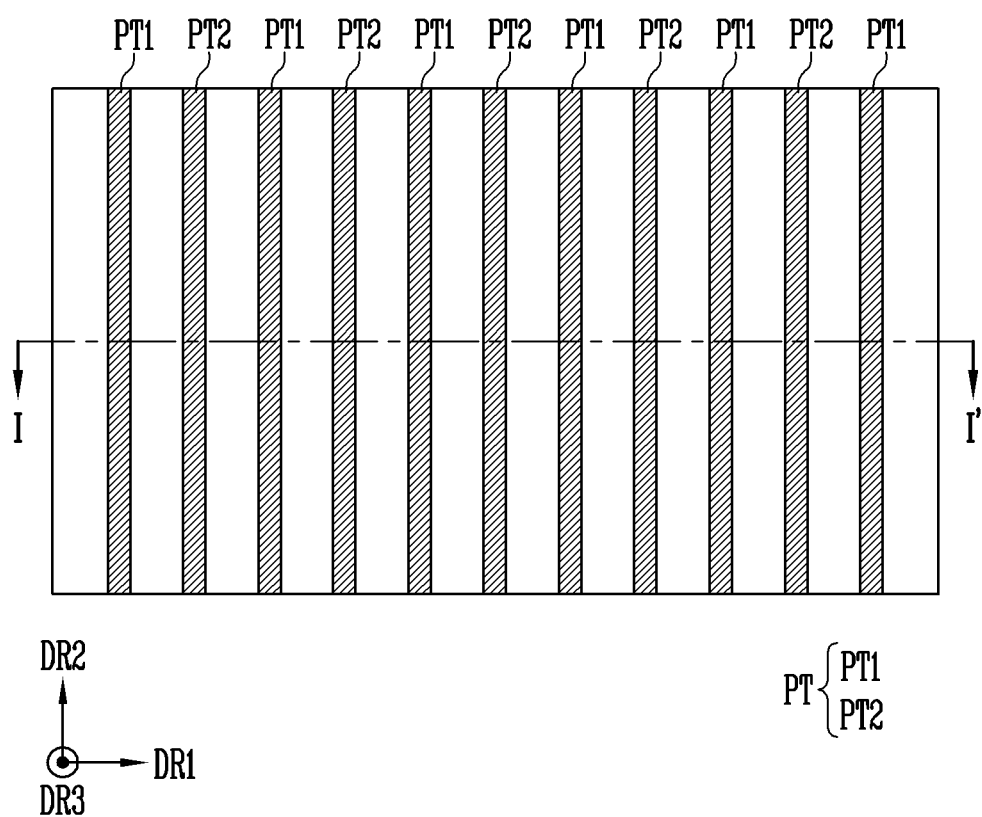

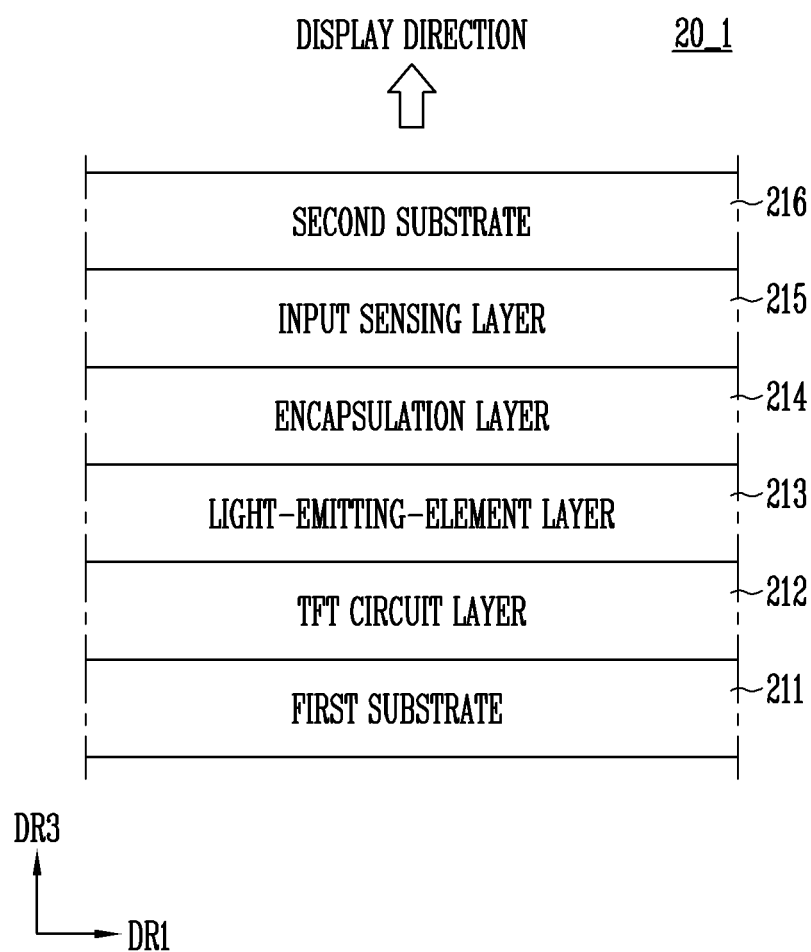

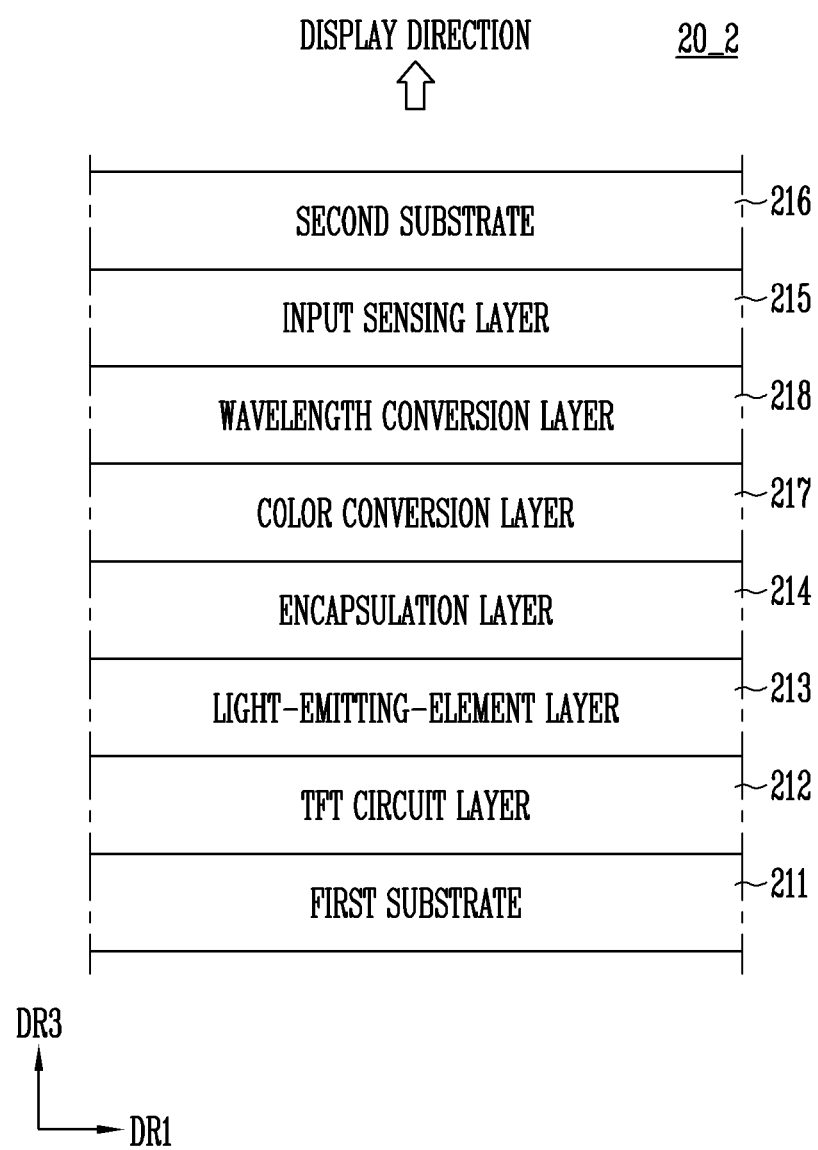

OPTICAL FILM, DISPLAY PANEL AND DISPLAY DEVICE INCLUDING THE SAME

CROSS-REFERENCE TO RELATED APPLICATION

This application claims priority from and the benefit of Korean Patent Application No 10-2019-0112782 filed on Sep. 11, 2019, which is hereby incorporated by reference for all purposes as if fully set forth herein.

BACKGROUND

Field

Exemplary implementations of the invention relate generally to a display device, and, more particularly, to an optical film, a display panel, and a display device including the same.

Discussion of the Background

The importance of display devices have been gradually increasing with the development of multimedia. Therefore, various display devices such as a liquid crystal display device or an organic light emitting display device have been developed. As the size of the display device increases, the development of a display device having excellent side visibility is required. Recently, research into an attachable optical film for improving the visibility of the display device has been conducted. For example, various forms of interfaces have been researched to emit light at various angles by making an optical film using substances of different refractive indices and then refracting or reflecting an optical path at the interface.

The above information disclosed in this Background section is only for understanding of the background of the inventive concepts, and, therefore, it may contain information that does not constitute prior art.

SUMMARY

Applicant realized that there is a problem when the viewing-angle gamma distortion index (GDI) of a display device sharply increases at a certain angle, and the viewing-angle gamma distortion index varies depending on direction.

Optical films and display devices including the same constructed according to the principles and exemplary implementations of the invention are capable of reducing the asymmetry of visibility depending on a direction. For example, according to some exemplary implementations, the optical film may include two refractive layers in direct contact with each other and having different refractive indices, with one of the layers having protrusions of different heights and sides having inclination angles that decrease along the height of the protrusion. Optical films and display devices including the same constructed according to some exemplary implementations of the invention have an excellent contrast ratio and improve the viewing-angle gamma distortion index.

Moreover, optical films constructed according to the principles and some exemplary methods of the invention reduce manufacturing cost and time.

Additional features of the inventive concepts will be set forth in the description which follows, and in part will be apparent from the description, or may be learned by practice of the inventive concepts.

According to one aspect of the invention, an optical film for a display device, includes: a first refractive layer having an upper surface and a lower surface including first projections and second projections extending away from the lower surface in a first direction, the second projections having different heights than the first projections, the first projections having lateral sides with different angles of inclination that decrease in the first direction; and a second refractive layer disposed directly on the upper surface of the first refractive layer, the second refractive layer having a refractive index different from that of the first refractive layer.

The refractive index of the second refractive layer may be greater than the refractive index of the first refractive layer.

The difference between the refractive index of the first refractive layer and the refractive index of the second refractive layer may be at least about 0.1.

The inclination angle of at least one of the sides may be from about 68° to about 90°.

All of the lateral sides may have an internal angle between adjacent sides of no more than about 180°.

The height of the first projections may be from about 7 μm to about 16 μm.

The first projections and the second projections may form a first lens pattern and a second lens pattern, respectively, each of which may extend in a second direction different from the first direction.

The first lens pattern and the second lens pattern may be alternately arranged in intersecting directions.

The first lens pattern and the second lens pattern may be disposed continuously without a gap therebetween, or may be disposed at a spacing distance between the first lens pattern and the second lens pattern of no more than about 10 μm.

Each of the first lens pattern and the second lens pattern may have a ratio of height to width in the first direction of about 0.5 to about 3.

At least some of the second projections may have lateral sides having different angles of inclination that decrease in a first direction away from the lower surface.

The lateral sides of the second projections may have a single side, and an inclination angle of the single side may be about 68° to about 90°.

The first refractive layer further may have third projections having a different height than that of the first projections and the second projections.

The third projections from a third lens pattern may have lateral sides including first, second, and third sides having different angles of inclination that may decrease in the first direction.

The second refractive layer may have a thickness of about 7 μm to about 16 μm.

The first refractive layer may include a base area including the lower surface, which may be substantially flat.

According to another aspect of the invention, a method of manufacturing an optical film from a rotatable member and a molding member includes the steps of: forming a surface of a rolling member using a cutting member; forming a surface of the molding member by moving and rotating the rolling member in a preset direction; and forming an optical member into a first refractive layer by compressing the molding member against the optical member to form a plurality of embossed patterns having a first pattern and a second pattern with different heights.

The cutting member may include a diamond cutting portion.

The steps of forming a second refractive layer may have a refractive index different from that of the first refractive layer on the first refractive layer, and form a cover film including a polyethylene terephthalate on the second refractive layer.

According to a further aspect of the invention, a display device includes: a display panel having a display surface; and an optical film including a first refractive layer disposed on the display surface, and a second refractive layer disposed on the first refractive layer and having a refractive index different from that of the first refractive layer, wherein the first refractive layer has an upper surface and a lower surface including first projections and second projections extending away from the lower surface in a first direction, the second projections having different heights than the first projections, the first projections having lateral sides with different angles of inclination that decrease in a first direction away from the lower surface.

The display panel may be configured to emit light traveling in one direction from the first refractive layer to the second refractive layer and to refract light from a surface of each of the first refractive layer and the second refractive layer.

The display device may have a front contrast ratio of at least about 1800.

The display device may have a 60° viewing-angle gamma distortion index of no more than about 0.150.

The first projections and the second projections may form a first lens pattern and a second lens pattern, respectively, each of which may extend in a second direction different from the first direction, and the first lens pattern and the second lens pattern are alternately arranged in intersecting directions.

The display panel may include one of a self-emission element and a quantum dot.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 2 is a plan view illustrating an exemplary embodiment of an optical film constructed according to principles of the invention.

FIG. 17 is a cross-sectional view illustrating another exemplary embodiment of a display panel constructed according to principles of the invention.

FIG. 19 is a cross-sectional view illustrating still another exemplary embodiment of a display panel constructed according to principles of the invention.

DETAILED DESCRIPTION

Figure 1A:
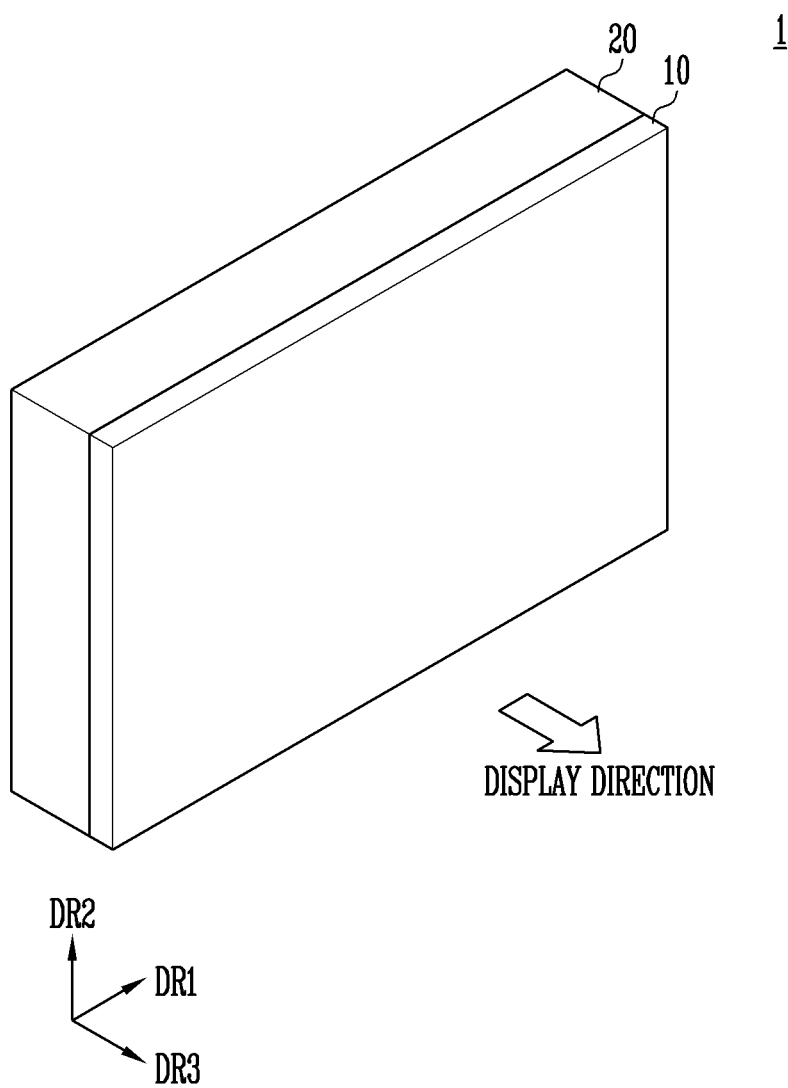
FIG. 1A is a perspective view illustrating an exemplary embodiment of a display device constructed according to principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

As used herein, a term "inclination angle" means an angle between a configuration and a plane defining a thickness direction of a member including the configuration as a normal line. Furthermore, the inclination angle and other angles of a component are referred with reference to an internal angle. The inclination angle may in a range from more than 0° to no more than 90°. The inclination angle of 90° means that it is steep vertically.

Figure 1B:
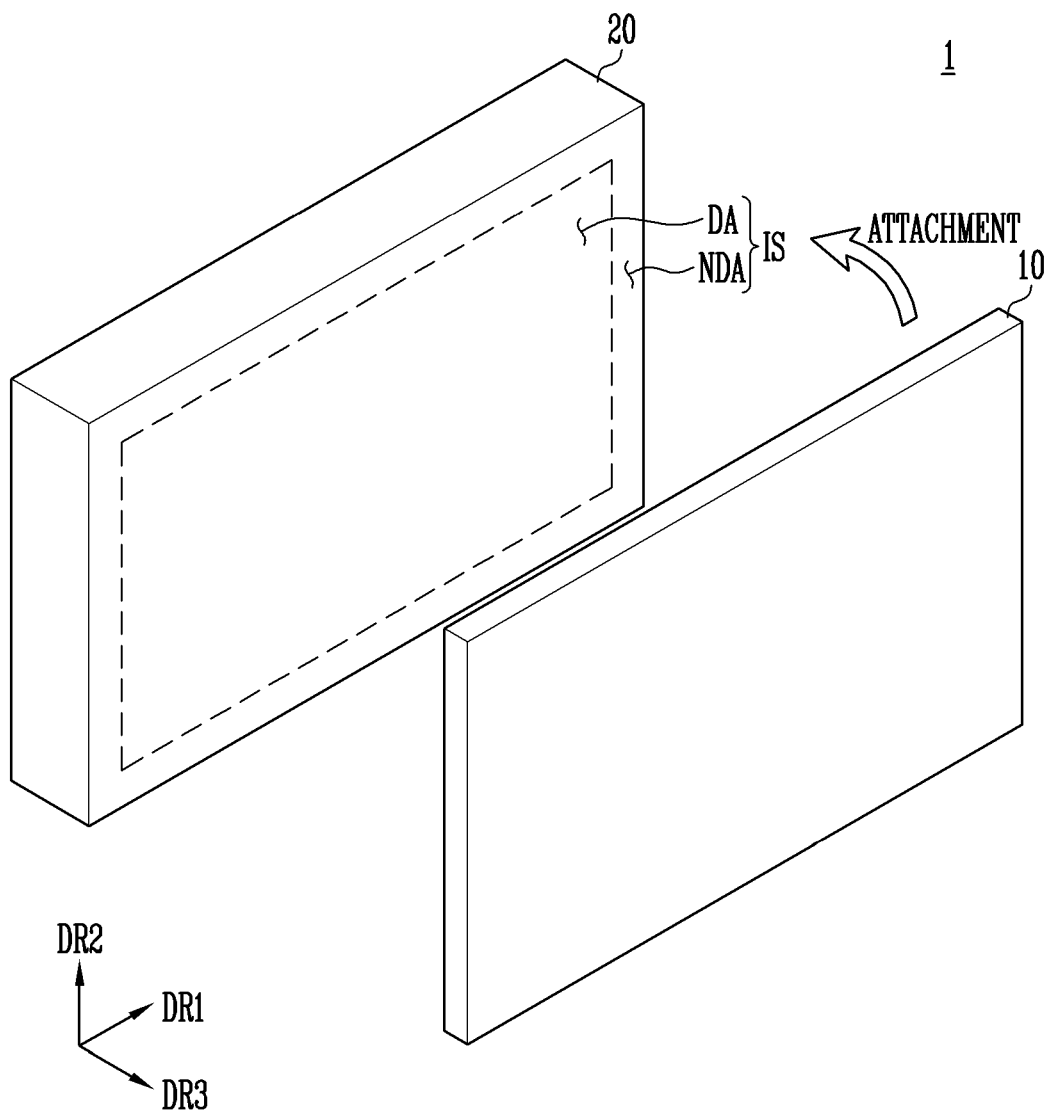
FIG. 1B is a perspective view illustrating an exemplary embodiment of part of a method of manufacturing the display device of FIG. 1 according to principles of the invention.

FIG. 1A is a perspective view illustrating an exemplary embodiment of a display device constructed according to principles of the invention. FIG. 1B is a perspective view illustrating an exemplary embodiment of part of a method of manufacturing the display device of FIG. 1 according to principles of the invention.

Hereinafter, a large-sized device such as a television will be described as an example of the display device 1. However, without being limited thereto, a small-sized device such as a smartphone, a tablet PC, a mobile phone, a video phone, an e-book reader, a desktop PC, a laptop PC, a netbook computer, a workstation, a server, a PDA, a portable multimedia player (PMP), an MP3 player, a medical device, a camera, a wearable or other device may be applied as the display device 1.

Referring to FIGS. 1A and 1B, the display device 1 includes a display panel 20, and an optical film 10 attached to a surface of the display panel 20.

The display panel 20 may display an image through a display surface IS. A display direction may be defined in a normal direction of the display surface IS. As illustrated in the drawings, the display surface IS is placed on a front surface of the display panel 20, and generally has the shape of a plane defined by a first direction DR1 and a second direction DR2 crossing the first direction DR1. For example, the display surface IS may have a generally rectangular shape that has long sides in the first direction DR1 and short sides in the second direction DR2.

Furthermore, a display direction is shown as being a third direction DR3. However, this is merely illustrative. According to another exemplary embodiment, the display device 1 may be implemented with a generally curved shape display surface IS. In this case, the display direction may have several directions.

The thickness direction of the display panel 20 or the optical film 10 is indicated by the third direction DR3. Respective members having a stacked arrangement structure are divided by the third direction DR3. For example, upper and lower portions of each of the members having the stacked arrangement structure are divided by the third direction DR3. That is, a direction from the bottom to the top of a member may be the third direction DR3.

However, since the direction indicated by the first to third directions DR1, DR2, and DR3 is a relative concept, it may be converted into another direction. Hereinafter, the first to third directions DR1, DR2, and DR3 are directions indicated by the first to third direction DR1, DR2, and DR3, and will be designated, respectively, by the same reference characters as those of the first to third direction DR1, DR2, and DR3.

According to some exemplary embodiments, the display panel 20 may be a liquid crystal display panel. However, without being limited thereto, an OLED panel, a quantum-dot OLED panel, a quantum-dot LED panel, a micro LED display panel, a plasma display panel, an electrophoretic display panel, a micro electromechanical system (MEMS) display panel, an electrowetting display panel, etc. may be applied as the display panel 20.

The display surface IS may include a display area DA where an image is displayed, and a non-display area NDA adjacent to the display area DA. The display area DA may include light emission areas that emit light of a predetermined color.

The non-display area NDA is the area on which no image is displayed. The display area DA may have a generally rectangular shape. The non-display area NDA may be disposed to enclose the display area DA on a plane. However, the exemplary embodiment is not limited thereto, and the shape of the display area DA and the shape of the non-display area NDA may be relatively designed.

According to some exemplary embodiments, the optical film 10 may be attached to the display surface IS of the display panel 20. The optical film 10 may pass light emitted from the display panel 20 in one direction (e.g. third direction DR3), and then may refract or reflect the light in several directions including the display direction.

If the optical film 10 is used in the display device 1, the contrast ratio and the visibility may be improved. Furthermore, the display device 1 may provide an excellent side viewing angle while realizing excellent front luminance by the optical film 10.

Although the drawings show that the optical film 10 is directly attached to the display panel 20, exemplary embodiments are not limited thereto. Another member may be interposed between the optical film 10 and the display panel 20. For example, a polarizing sheet may be interposed between the optical film 10 and the display panel 20.

According to some exemplary embodiments, the optical film 10 and the display panel 20 are independently manufactured and then attached to each other to manufacture the display panel 20. However, without being limited thereto, the display device 1 may be manufactured by forming the optical film 10 on the display panel 20.

Next, the optical film 10 will be described in detail with reference to FIGS. 2 to 5.

Figure 3:
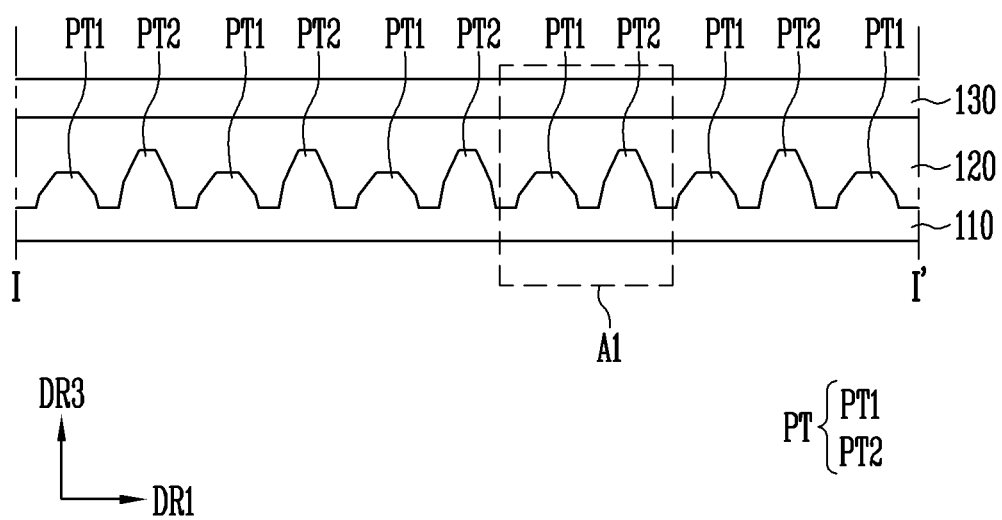
FIG. 3 is a cross-sectional view of the optical film taken along line I-I' of FIG. 2.

FIG. 2 is a plan view illustrating an exemplary embodiment of an optical film constructed according to principles of the invention. FIG. 3 is a cross-sectional view of the optical film taken along line I-I' of FIG. 2.

Referring to FIGS. 2 and 3, the optical film 10 includes a plurality of lens patterns PT. Although the drawings show that the optical film 10 includes eleven lens patterns PT, this is merely illustrative and any suitable number of lens patterns may be utilized.

The lens patterns PT may be formed on an interface between two refractive layers (e.g. first refractive layer 110 and second refractive layer 120) having different refractive indices.

Each lens pattern PT may be formed to extend in the second direction DR2 when viewed in plan. The plurality of lens patterns PT may be arranged in the first direction DR1. Adjacent lens patterns PT may be arranged to have a predetermined spacing distance or to come into contact with each other. That is, although the drawings show that the adjacent lens patterns PT are arranged to have a predetermined spacing distance in the first direction DR1, exemplary embodiments are not limited thereto.

The lens patterns PT may have a plurality of shapes. For example, the plurality of lens patterns PT may include first lens patterns PT1 and second lens patterns PT2 having different shapes.

The optical film 10 may include a first refractive layer 110, a second refractive layer 120, and a cover film 130.

The first refractive layer 110 may include the plurality of lens patterns PT protruding towards the second refractive layer 120 and the first refractive layer 110 may include an upper surface USF and a lower surface LSF. The plurality of lens patterns PT may be disposed on the upper portion of the first refractive layer 110. The plurality of lens patterns PT formed on the first refractive layer 110 may be an embossed pattern formed on the upper portion of the first refractive layer 110. A lower portion of the first refractive layer 110 may be a substantially flat surface. When the optical film 110 is attached to the display panel 20, the lower portion of the first refractive layer 110 may be a surface closest to the display panel 20.

The second refractive layer 120 may be disposed on the first refractive layer 110. According to some exemplary embodiments, a lower portion of the second refractive layer 120 may be in direct contact with the upper portion of the first refractive layer 110. Thus, engraved or intaglio patterns corresponding to the embossed patterns formed on the upper portion of the first refractive layer 110 may be formed on the lower portion of the second refractive layer 120. An upper portion of the second refractive layer 120 may be a substantially flat surface.

The cover film 130 may be disposed on the second refractive layer 120. Although the drawing shows that the second refractive layer 120 is in direct contact with the cover film 130, it is apparent that another member may be interposed between the second refractive layer 120 and the cover film 130.

According to some exemplary embodiments, the first refractive layer 110 and the second refractive layer 120 may contain a polymer resin. Each resin forming the first and second refractive layers 110 and 120 may contain other substances.

The polymer resin may contain a UV curable resin, a thermosetting resin, an acrylate resin, or a fluorine resin. For example, the polymer resin may be selected from a polyethersulphone (PES), a polyacrylate (PA), a polyarylate (PAR), a polyetherimide (PEI), a polyethylenenapthalate (PEN), a polyethyleneterepthalate (PET), a polyphenylenesulfide (PPS), a polyallylate, a polyimide (PI), a polycarbonate (PC), a cellulosetriacetate (CAT), a cellulose acetate propionate (CAP), or a combination-thereof.

The first refractive layer 110 or the second refractive layer 120 may be formed by forming the resin film using the molding member, as described hereinafter. However, the method of manufacturing the optical film 10 is not limited thereto, but may also be formed through an imprinting method or the like.

The cover film 130 may be formed of one substance selected from a polymethyl methacrylate (PMMA), a polystyrene (PS), a polycarbonate (PC), a cyclo-olefin copolymers (COC), a polyethylene terephthalate (PET), a polybutyleneterephtalate (PBT), and a plastic alloy, but is not limited thereto.

The first refractive layer 110 and the second refractive layer 120 may have different refractive indices from each other. According to an exemplary embodiment, the refractive index of the first refractive layer 110 may be smaller than that of the second refractive layer 120. According to some exemplary embodiments, the difference between the refractive index of the first refractive layer 110 and the refractive index of the second refractive layer 120 may be at least about 0.1. For example, the refractive index of the first refractive layer 110 may be in the range of about 1.30 to about 1.45, and the refractive index of the second refractive layer 120 may be in the range of about 1.55 to about 1.7, but the refractive indices of the first and second refractive layers are not limited thereto. When the optical film 10 is formed such that the refractive index of the first refractive layer 110 is smaller than the refractive index of the second refractive layer 120, the optical film 10 may refract light emitted from the display panel 20, thus improving the viewing angle of the display device 1. In the exemplary embodiment, the first refractive layer 110 is a low refractive layer, while the second refractive layer 120 is a high refractive layer.

According to other exemplary embodiments, the refractive index of the first refractive layer 110 may be more than that of the second refractive layer 120 by at least about 0.1. When the optical film 10 is formed such that the refractive index of the first refractive layer 110 is larger than the refractive index of the second refractive layer 120, the optical film 10 may refract or (total) reflect light emitted from the display panel 20, thus improving the viewing angle of the display device 1. The light emitted from the display panel 20 may be refracted or (total) reflected at the interface between the first refractive layer 110 and the second refractive layer 120.

Figure 4:
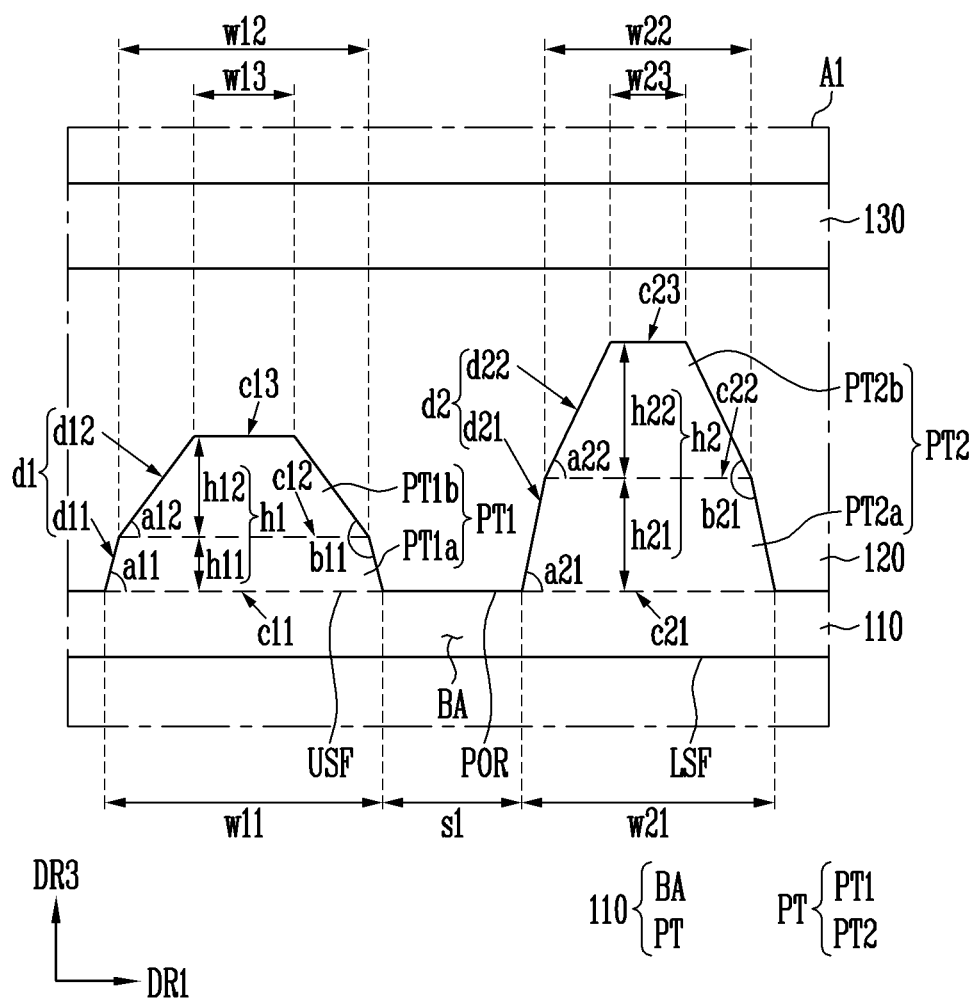
FIG. 4 is an enlarged cross-sectional view of area A1 of FIG. 3.

FIG. 4 is an enlarged cross-sectional view of area A1 of FIG. 3. Referring to FIG. 4, the first lens pattern PT1 and the second lens pattern PT2 of different shapes may be formed to protrude from a base area BA.

The first refractive layer 110 includes the base area BA and the first and second lens patterns PT1 and PT2 protruding upwardly from the base area BA. A surface of the first lens pattern PT1 overlapping an imaginary plane including an upper surface USF of the base area BA may be defined as a lower surface of the first lens pattern PT1. Likewise, a surface of the second lens pattern PT2 overlapping the imaginary plane including the upper surface USF of the base area BA may be defined as a lower surface of the second lens pattern PT2. According to some exemplary embodiments, the upper surface of each of the first and second lens patterns PT1 and PT2 may be generally parallel to the upper surface USF or the lower surface LSF of the base area BA. In some exemplary embodiments, the upper surface USF of the base area BA may form the upper surface of the first refractive layer 110 and the second refractive layer 120 may be disposed directly on at least a portion POR of the upper surface USF of the first refractive layer 110. In some exemplary embodiments, the base area BA may be omitted, and the first refractive layer 110 may be defined only by the lens patterns PT.

In the cross-section of FIG. 4, an upper side c13 of the first lens pattern PT1 is one side included in the upper surface of the first lens pattern PT1. A lower side c11 of the first lens pattern PT1 is one side included in the lower surface of the first lens pattern PT1. An upper side c23 of the second lens pattern PT2 is one side included in the upper surface of the second lens pattern PT2. A lower side c21 of the second lens pattern PT2 is one side included in the lower surface of the second lens pattern PT2. The upper sides c13 and c23 and the lower sides c11 and c21 of the respective lens patterns may be imaginary sides extending in the first direction DR1.

The first lens pattern PT1 and the second lens pattern PT2 may include lateral sides d1 and d2 connecting the upper sides c13 and c23 with the lower sides c11 and c21, respectively. The lateral sides d1 and d2 may include a plurality of sides d11, d12, d21, and d22 extending in different directions. As the arrangement direction of the plurality of sides d11, d12, d21 and d22 proceeds upwardly in the third direction DR3, the internal angles a11, a12, a21 and a22 of the respective lens patterns PT1 and PT2 with the respective lower sides c11 and c21 may decrease. As the position proceeds upwardly in the third direction DR3 (protruding direction, thickness direction) at each of the lateral sides d1 and d2, the inclination angles (e.g. a11, a12, a21, a22) of the sides d11, d12, d21 and d22 may decrease. That is, as the arrangement direction of the plurality of sides proceeds upwardly in the third direction DR3, the inclination (slope) of the sides decreases. The inclination angle (e.g. a11, a12, a21, a22) corresponds to an angle obtained by subtracting an angle between an imaginary extension line including one side d11, d12, d21, d22 and the flat upper surface USF or lower surface LSF of the base area BA, or an angle between an imaginary extension line extending in the thickness direction (e.g. third direction DR3) and an imaginary extension line including one side d11, d12, d21, d22 from 90°.

According to some exemplary embodiments, the plurality of sides d11, d12, d21 and d22 may have inclination angles (e.g. a11, a12, a21, a22) in the range of about 68° to about 90° with reference to the internal angle in the respective lens patterns PT1 and PT2 (compare, e.g., the inclination angle of about 90° is possible only at a11 or a21, and the inclination angle of about 68° is possible only at a12 or a22).

The first lens pattern PT1 and the second lens pattern PT2 may include one lateral side and the other lateral side connecting the upper sides c13 and c23 with the lower sides c11 and c21 with respect to the first direction DR1. The one lateral side and the other lateral side have a line symmetry relationship with respect to the imaginary line extending in the third direction DR3. Therefore, in the following description, it will be understood that the lateral sides d1 and d2 refer to any one of one lateral side and the other lateral side, and the shape of the remaining one has the line symmetry relationship with respect to the imaginary line extending in the third direction DR3.

The lateral side d1 of the first lens pattern PT1 may include the first lateral side d11 and the second lateral side d12 extending in different directions. For example, the first side d11 may be defined as a side adjacent to the lower side c11 of the first lens pattern PT1, and the second side d12 may be defined as a side adjacent to the upper side c13 of the first lens pattern PT1. The first side d11 and the second side d12 may be in contact with each other.

The internal angle a11 between the first side d11 of the first lens pattern PT1 and the lower side c11 may be larger than the internal angle a12 between the second side d12 of the first lens pattern PT1 and the lower side c11. As an exemplary embodiment, the internal angle a11 between the first side d11 of the first lens pattern PT1 and the lower side c11 may be about 87°, and the internal angle a12 between the second side d12 and the lower side c11 may be about 76°. However, the above internal angles are merely illustrative, and the internal angle a11 between the first side d11 and the lower side c11, and the internal angle a12 between the second side d12 and the lower side c11 may be selected within the range of about 68° to about 90°.

An imaginary side c12 including points where the first and second sides d11 and d12 on both lateral sides d1 in the first lens pattern PT1 are in contact with each other, the lower side c11, and both the first sides d11 may define a first protruding area PT1a. The imaginary side c12 including points where the first and second sides d11 and d12 on both lateral sides d1 in the first lens pattern PT1 are in contact with each other, the upper side c13, and both the second sides d12 may define a second protruding area PT1b.

The first lens pattern PT1 includes the first protruding area PT1a and the second protruding area PT1b. Each of the first protruding area PT1a and the second protruding area PT1b in the first lens pattern PT1 may have a generally trapezoidal shape. Precisely, each protruding area PT1a or PT1b may have a generally isosceles trapezoidal shape. According to some exemplary embodiments, the first protruding area PT1a may have a generally rectangular shape. The second protruding area PT1b in the first lens pattern PT1 is the area located on the first protruding area PT1a. The respective lateral sides of the first protruding area PT1a and the second protruding area PT1b in the first lens pattern PT1 correspond to, respectively, the first side d11 and the second side d12. That is, the inclination angles a11 and a12 between the respective lateral sides of the first protruding area PT1a and the second protruding area PT1b and the lower side c11 of the first lens pattern PT1 may be different from each other.

The height h1 of the first lens pattern PT1 is equal to the sum of the height h11 of the first protruding area PT1a and the height h12 of the second protruding area PT1b. The height h1 of the first lens pattern PT1 may be about 7 μm to about 16 μm. The height h11 of the first protruding area PT1a may be equal to or different from the height h12 of the second protruding area PT1b. According to an exemplary embodiment, the height h11 of the first protruding area PT1a may be about 2 μm, and the height h12 of the second protruding area PT1b may be about 6 μm.

Respective lengths (widths) (e.g. w11, w12, w13) of the lower side c11 of the first lens pattern PT1, the imaginary side c12 including points where the first and second sides d11 and d12 are in contact with each other on both lateral sides d1 in the first lens pattern PT1, and the upper side c13 of the first lens pattern PT1 may be sequentially decreased. According to some exemplary embodiments, the width w11 in the first direction DR1 of the first lens pattern PT1 (i.e. the length of the lower side c11 of the first lens pattern PT1) may be about 5 μm to about 15 μm. According to an exemplary embodiment, the width w11 in the first direction DR1 of the first lens pattern PT1 may be 7 μm. The width w13 of the upper side c13 of the first lens pattern PT1 may be smaller than the width w11 of the lower side c11.

The lateral side d2 of the second lens pattern PT2 may include the third side d21 and the fourth side d22 extending in different directions. For example, the third side d21 may be defined as a side adjacent to the lower side c21 of the second lens pattern PT2, and the fourth side d22 may be defined as a side adjacent to the upper side c23 of the second lens pattern PT2. The third side d21 and the fourth side d22 may be in contact with each other.

The internal angle a21 between the third side d21 of the second lens pattern PT2 and the lower side c21 may be larger than the internal angle a22 between the fourth side d22 of the second lens pattern PT2 and the lower side c21. As an exemplary embodiment, the internal angle a21 between the third side d21 of the second lens pattern PT2 and the lower side c21 may be about 87°, and the internal angle a22 between the fourth side d22 and the lower side c21 may be about 70°. However, the above internal angles are merely illustrative, and the internal angle a21 between the third side d21 and the lower side c21, and the internal angle a22 between the fourth side d22 and the lower side c21 may be variously selected within the range of about 68° to about 90°.

An imaginary side c22 including points where the third and fourth sides d21 and d22 on both lateral sides d2 in the second lens pattern PT2 are in contact with each other, a lower side c21, and both the third sides d21 may define a third protruding area PT2a. The imaginary side c22 including points where the third and fourth sides d21 and d22 on both lateral sides d2 in the second lens pattern PT2 are in contact with each other, an upper side c23, and both the fourth sides d22 may define a fourth protruding area PT2b.

The second lens pattern PT2 includes the third protruding area PT2a and the fourth protruding area PT2b. Each of the third protruding area PT2a and the fourth protruding area PT2b in the second lens pattern PT2 may have a generally trapezoidal shape. Precisely, each protruding area PT2a or PT2b may have a generally isosceles trapezoidal shape. According to some exemplary embodiments, the third protruding area PT2a may have a generally rectangular shape. The fourth protruding area PT2b in the second lens pattern PT2 is the area located on the third protruding area PT2a. The respective lateral sides d1 and d2 of the third protruding area PT2a and the fourth protruding area PT2b in the second lens pattern PT2 correspond to, respectively, the third side d21 and the fourth side d22. That is, the inclination angles a11, a12, a21, and a22 between the respective lateral sides d1 and d2 of the third and fourth protruding areas PT2a and PT2b and the lower sides c11 and c21 of the second lens pattern PT2 may be different from each other.

The height h2 of the second lens pattern PT2 is equal to the sum of the height h21 of the third protruding area PT2a and the height h22 of the fourth protruding area PT2b. The height of the second lens pattern PT2 may be about 7 μm to about 16 μm. The height h21 of the third protruding area PT2a may be equal to or different from the height h22 of the fourth protruding area PT2b. According to an exemplary embodiment, the height h21 of the third protruding area PT2a may be about 5 μm, and the height h22 of the fourth protruding area PT2b may be about 5 μm. According to some exemplary embodiments, the height h2 of the second lens pattern PT2 may be higher than the height h1 of the first lens pattern PT1.

Respective lengths (widths) (e.g. w21, w22, w23) of the lower side c21 of the second lens pattern PT2, the imaginary side c22 including points where the third and fourth sides d21 and d22 are in contact with each other on both lateral sides d2 in the second lens pattern PT2, and the upper side c23 of the second lens pattern PT2 may be sequentially decreased. The width w21 in the first direction DR1 of the second lens pattern PT2 (i.e. the length of the lower side c21 of the second lens pattern PT2) may be about 5 μm to about 15 μm. According to an exemplary embodiment, the width w21 in the first direction DR1 of the second lens pattern PT2 may be about 9 μm. The width w23 of the upper side c23 of the second lens pattern PT2 may be smaller than the width w21 of the lower side c21.

According to some exemplary embodiments, internal angles b11 and b21 between adjacent sides (e.g. d11 and d12, d21 and d22) on the respective lateral sides d1 and d2 of the first lens pattern PT1 and the second lens pattern PT2 may be less than about 180°.

According to some exemplary embodiments, the ratio of the heights h1 and h2 to the widths w11 and w21 of the first and second lens patterns PT1 and PT2 may be in the range of about 0.5 to about 3. In this regard, the widths may denote the lengths of the lower sides c11 and c21, namely, the widths w11 and w21 of the first direction DR1. For example, when the length of the lower side c11 of the first lens pattern PT1 is about 7 μm and the height h1 of the first lens pattern PT1 is about 8 μm, the ratio of the height h1 to the width w1 of the first lens pattern PT1 may be about 1.143.

The first lens pattern PT1 and the second lens pattern PT2 may be alternately arranged in the first direction DR1. The first and second lens patterns PT1 and PT2 may be continuously arranged without a gap or alternately arranged with a predetermined distance s1 therebetween. When the predetermined distance s1 is provided between the first and second lens patterns PT1 and PT2, the distance s1 may be in the range of about 4 μm to about 10 μm. According to an exemplary embodiment, the distance s1 between the first and second lens patterns PT1 and PT2 may be about 4 μm.

Figure 5:
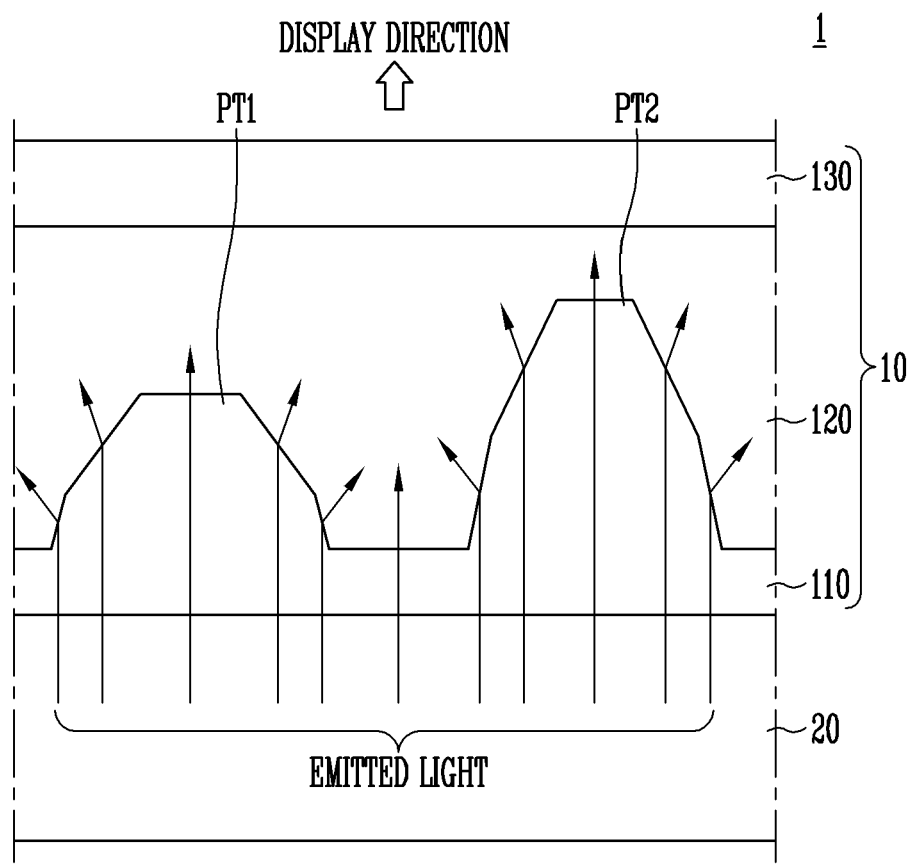
FIG. 5 is a conceptual diagram illustrating an exemplary embodiment of the optical path along which light emitted from a display panel passes through an optical film constructed according to principles of the invention.

FIG. 5 is a conceptual diagram illustrating an exemplary embodiment of the optical path along which light emitted from a display panel passes through an optical film constructed according to principles of the invention.

Referring to FIG. 5, some of the emitted light progressing from the display panel 20 in the third direction DR3 may be refracted while passing through the optical film 10. The emitted light may be refracted at the interface between the first refractive layer 110 and the second refractive layer 120. Some of the emitted light that is obliquely incident onto the interface between the first refractive layer 110 and the second refractive layer 120 is refracted, while the remaining emitted light that is vertically incident onto the interface between the first refractive layer 110 and the second refractive layer 120 may progress in the third direction DR3 without being refracted.

The optical film 10 may refract some of the light emitted from the display panel 20, thus providing an excellent side viewing angle. Next, the display panel 20 will be described.

Figure 6:
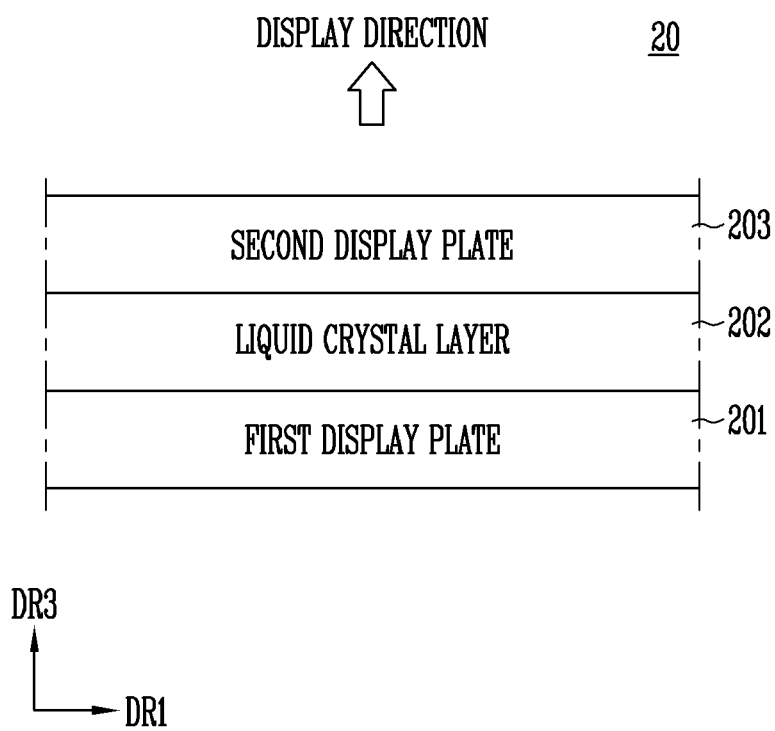
FIG. 6 is a schematic sectional view illustrating an exemplary embodiment of the display panel of FIG. 1.

FIG. 6 is a schematic sectional view illustrating an exemplary embodiment of the display panel of FIG. 1.

Referring to FIG. 6, the display panel 20 may include a first display plate 201, a second display plate 203, and a liquid crystal layer 202. The first display plate 201 and the second display plate 203 are disposed to face each other. The liquid crystal layer 202 is interposed between the first display plate 201 and the second display plate 203. The liquid crystal layer 202 may contain a plurality of liquid crystal molecules. In an exemplary embodiment, the first display plate 201 may be attached to the second display plate 203 through sealing.

According to some exemplary embodiments, the first display plate 201 may be formed by sequentially stacking a base substrate, a gate conductor, a data conductor, a semiconductor layer, and a transparent conductor. If necessary, an insulation layer may be interposed between respective members of the first display plate 201.

According to some exemplary embodiments, the base substrate may be a transparent insulation substrate. Here, the transparent insulation substrate may include a glass material, a quartz material, or a transparent plastic material. According to another embodiment, the base substrate may be a flexible substrate, or a shape in which a plurality of films is stacked.

The gate conductor may be disposed on the base substrate. The gate conductor may be formed of a single film selected from conductive metal containing aluminum (Al), copper (Cu), molybdenum (Mo), chromium (Cr), titanium (Ti), tungsten (W), molybdenum tungsten (MoW), molybdenum titanium (MoTi), and copper/molybdenum titanium (Cu/MoTi), a double film or a triple film consisting of at least two or three components. The gate conductor may include a gate line, a gate electrode of a transistor, a storage electrode, and a repair line. Furthermore, they may be simultaneously formed through the same mask process.

The data conductor may be disposed on the gate conductor. The data conductor may be formed of a single film selected from conductive metal containing aluminum (Al), copper (Cu), molybdenum (Mo), chromium (Cr), titanium (Ti), tungsten (W), molybdenum tungsten (MoW), molybdenum titanium (MoTi), and copper/molybdenum titanium (Cu/MoTi), a double film or a triple film consisting of at least two or three components. The data conductor may include a data line, a source electrode of the transistor, and a drain electrode. Furthermore, they may be simultaneously formed through the same mask process.

The semiconductor layer may be disposed on the data conductor. According to exemplary embodiments, the semiconductor layer may be formed of an amorphous silicon, a polycrystalline silicon, or the like. According to another embodiment, the semiconductor layer may include an oxide semiconductor. When the semiconductor layer includes the oxide semiconductor, the semiconductor layer may be formed of one selected from oxide semiconductors including IGZO(In-Ga-Zinc-Oxide), ZnO, $ZnO_2$, CdO, SrO, $SrO_2$, CaO, $CaO_2$, MgO, $MgO_2$, InO, $In_2O_2$, GaO, $Ga_2O$, $Ga_2O_3$, SnO, $SnO_2$, GeO, $GeO_2$, PbO, $Pb_2O_3$, $Pb_3O_4$, TiO, $TiO_2$, $Ti_2O_3$, and $Ti_3O_5$. The semiconductor layer may form a channel area of the transistor.

The transparent conductor may be disposed on the semiconductor layer. The transparent conductor may include a transparent conductive substance. Here, the transparent conductive substance may include a polycrystalline, a monocrystalline, or an amorphous indium tin oxide (ITO). The transparent conductor may include a plurality of pixel electrodes.

In some exemplary embodiments, the second display plate 203 may be formed by sequentially stacking a window substrate and a common electrode. Optionally, an insulation layer or a planarization layer may be interposed between respective members of the second display plate 203. The stacking direction of the second display plate 203 may be opposite to the stacking direction of the first display plate 201. For example, assuming that the first display plate 201 is stacked in the third direction DR3, the second display plate 203 may be stacked in a direction opposite to the third direction DR3.

The window substrate is disposed to face the base substrate. The window substrate may be formed of a transparent glass or plastic. According to some exemplary embodiments, the window substrate may be formed of the same material as the base substrate The common electrode may be disposed on the window substrate. At least a portion of the common electrode may overlap the plurality of pixel electrodes. According to some exemplary embodiments, the common electrode may be formed generally in the shape of a plate. However, without being limited thereto, the common electrode may include a plurality of slits. According to some exemplary embodiments, the common electrode may be formed of a transparent conductive substance such as ITO and IZO, or a reflective metal such as aluminum, silver, chromium, or an alloy thereof.

An alignment film may be disposed on each of the pixel electrode and the common electrode. A color filter and a black matrix may be provided in at least one of the first display plate 201 and the second display plate 203. When the optical film 10 is attached to the display panel 20 as depicted in FIG. 1A, the upper portion of the window substrate of the second display plate 203 may be closest to the optical film 10.

The liquid crystal layer 202 includes a plurality of liquid crystal molecules. According to some exemplary embodiments, the plurality of liquid crystal molecules may have anisotropy of a negative dielectric constant, and may be vertically aligned in an initial alignment state. The plurality of liquid crystal molecules may have a predetermined pretilt angle in the initial alignment state. The initial alignment of the plurality of liquid crystal molecules may be induced by each aforementioned alignment film. When an electric field is formed between the first display plate 201 and the second display plate 203, the plurality of liquid crystal molecules may change the polarization state of light passing through the liquid crystal layer 202 by tilting or rotating in a specific direction.

In some exemplary embodiments, a backlight unit may be disposed under the first display plate 201 to emit light that passes sequentially through the first display plate 201, the liquid crystal layer 202, and the second display plate 203.

Next, the method of manufacturing the optical film 10 will be described with reference to FIGS. 7A to 7H.

Figure 7A:
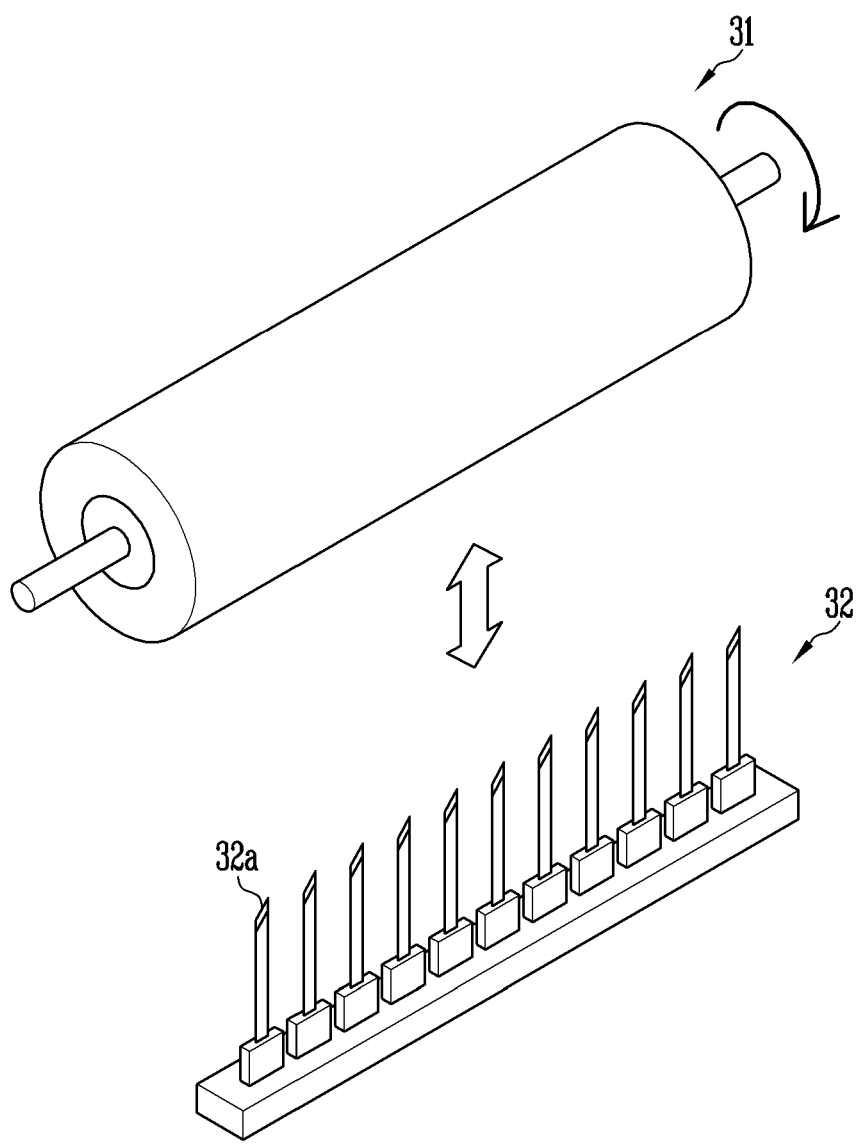
FIG. 7A is a diagram schematically illustrating an exemplary embodiment of a rolling member and a cutting member used in an exemplary method of manufacturing an optical film according to principles of the invention.
Figure 7B:
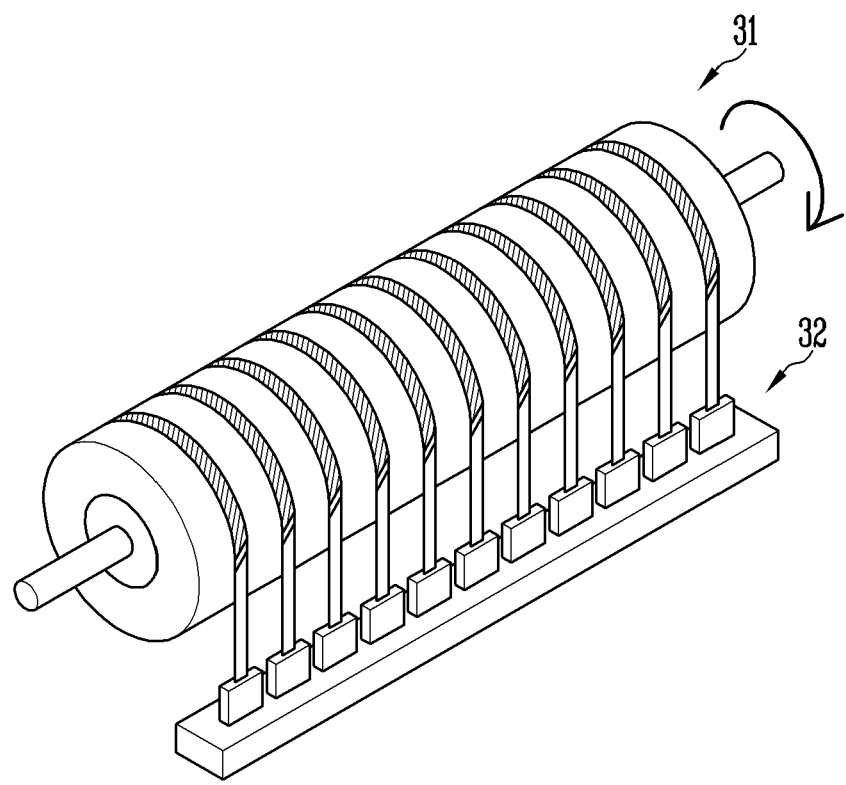
FIG. 7B is a diagram schematically illustrating an exemplary embodiment of a step of forming the surface of the rolling member of FIG. 7A.
Figure 7C:
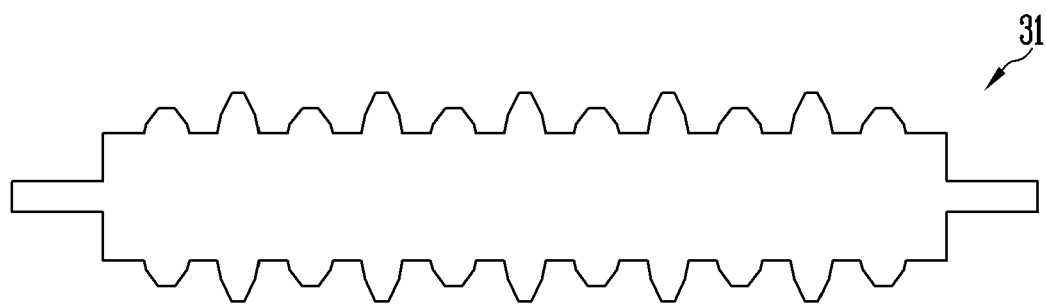
FIG. 7C is a diagram schematically illustrating an exemplary embodiment of a section of the rolling member subsequent to the step of FIG. 7B.
Figure 7D:
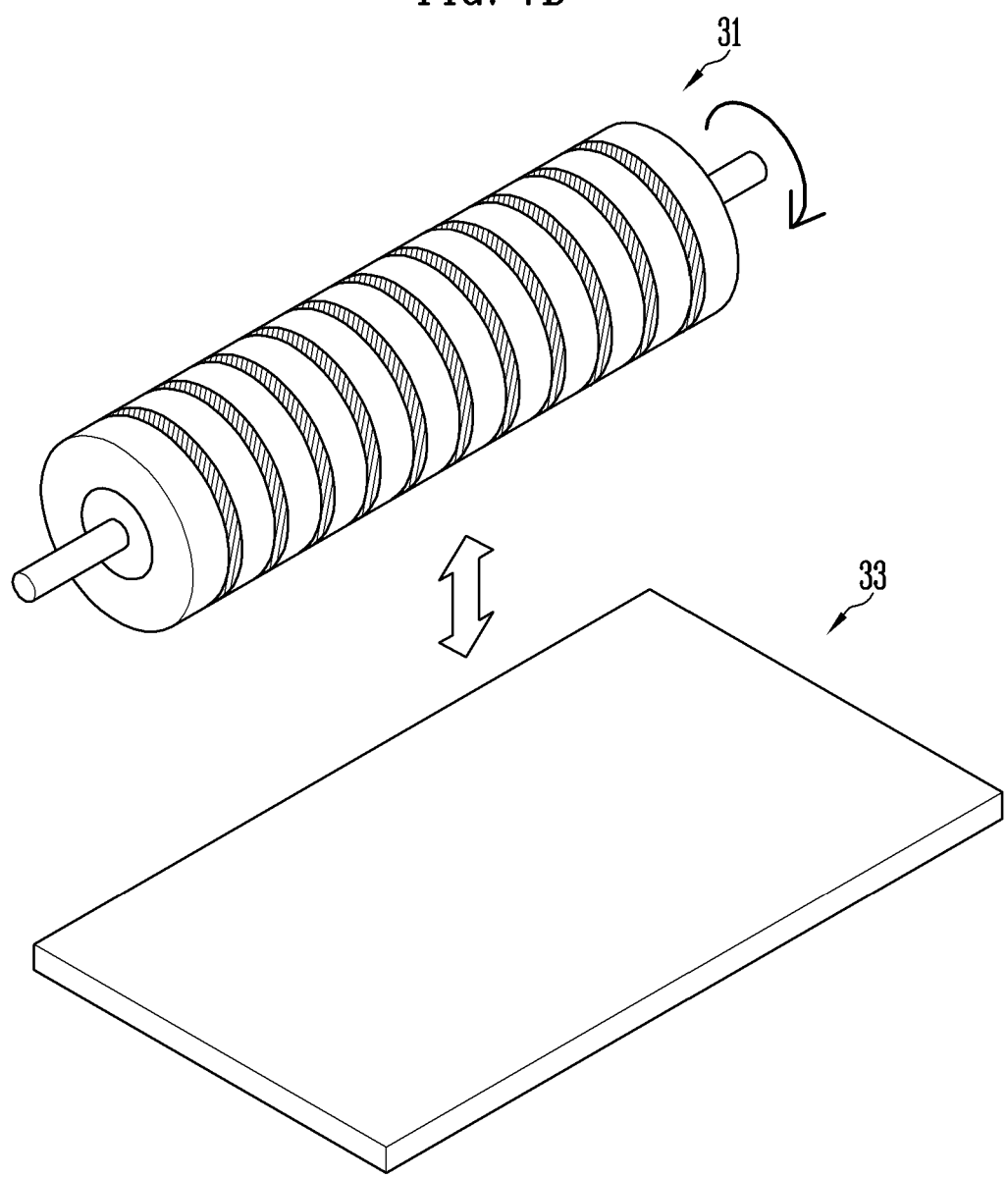
FIG. 7D is a diagram schematically illustrating an exemplary embodiment of the rolling member and a molding member used subsequent to the step of FIG. 7B.
Figure 7E:
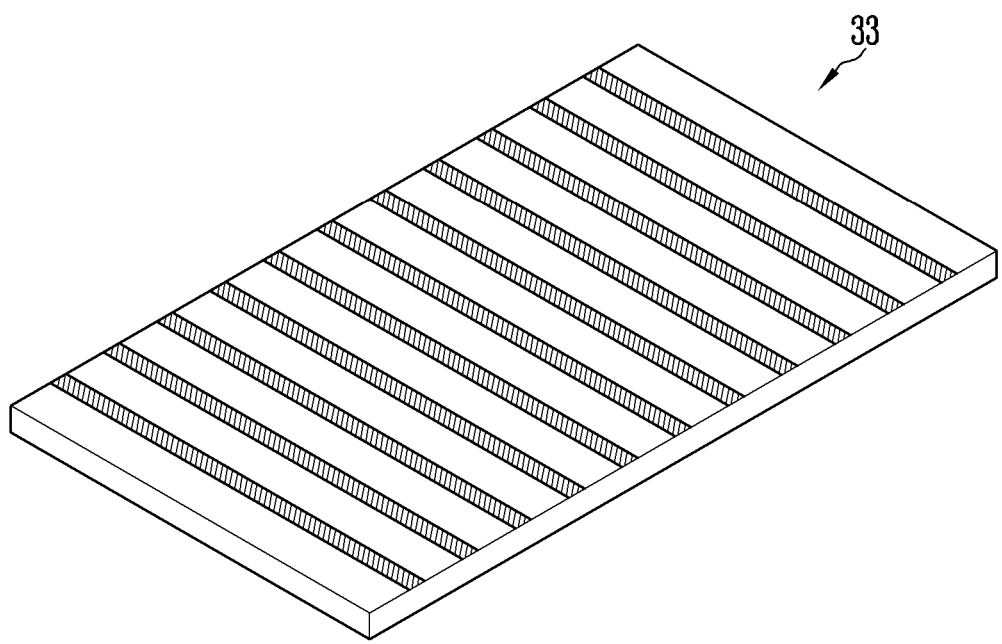
FIGS. 7E and 7F are diagrams schematically illustrating an exemplary embodiment of the molding member after a step of forming the surface of the molding member in the exemplary optical-film manufacturing method.
Figure 7F:
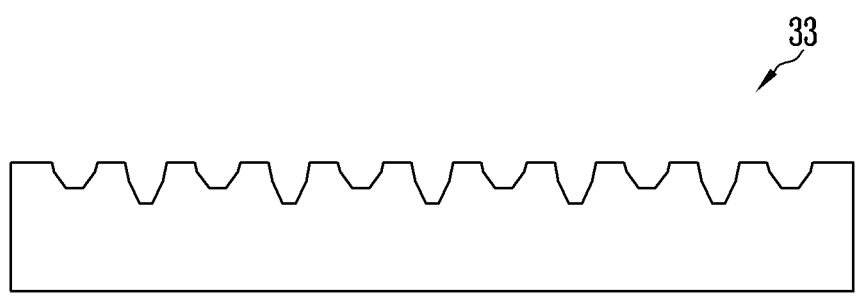
Figure 7G:
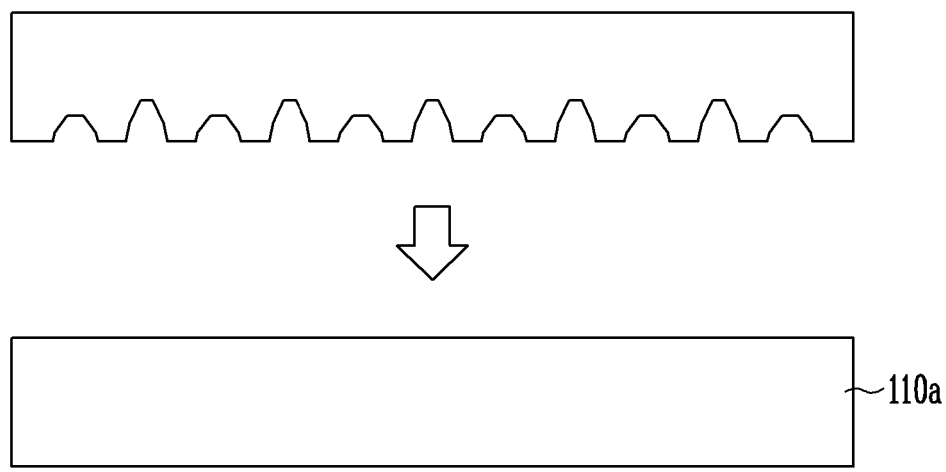
FIG. 7G is a diagram schematically illustrating an exemplary embodiment of the molding member and a first optical member after the step of forming the surface of the molding member in the exemplary optical-film manufacturing method.
Figure 7H:
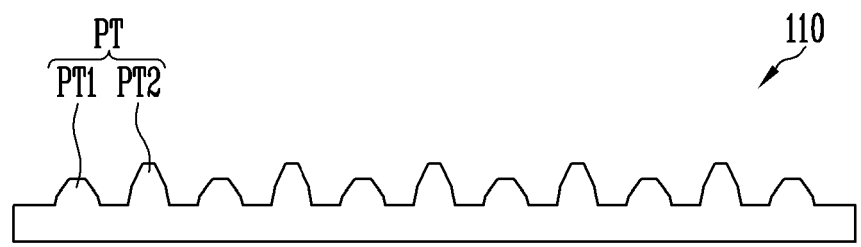
FIG. 7H is a diagram schematically illustrating an exemplary embodiment of a first refractive layer after the step of forming the surface of the first optical member in the exemplary optical-film manufacturing method.

FIG. 7A is a diagram schematically illustrating an exemplary embodiment of a rolling member and a cutting member used in an exemplary method of manufacturing an optical film according to principles of the invention. FIG. 7B is a diagram schematically illustrating an exemplary embodiment of a step of forming the surface of the rolling member of FIG. 7A. FIG. 7C is a diagram schematically illustrating an exemplary embodiment of a section of the rolling member subsequent to the step of FIG. 7B. FIG. 7D is a diagram schematically illustrating an exemplary embodiment of the rolling member and a molding member used subsequent to the step of FIG. 7B. FIGS. 7E and 7F are diagrams schematically illustrating an exemplary embodiment of the molding member after a step of forming the surface of the molding member in the exemplary optical-film manufacturing method. FIG. 7G is a diagram schematically illustrating an exemplary embodiment of the molding member and a first optical member after the step of forming the surface of the molding member in the exemplary optical-film manufacturing method. FIG. 7H is a diagram schematically illustrating an exemplary embodiment of a first refractive layer after the step of forming the surface of the first optical member in the exemplary optical-film manufacturing method.

According to some exemplary embodiments, the method of manufacturing the optical film 10 may include a rolling-member forming step, a molding-member forming step, and a first-optical-member forming step.

At the rolling-member forming step, the surface of the rolling member 31 may be formed by the cutting member 32. The rolling member 31 may have a pattern corresponding to the lens patterns PT that are to be formed on the surface of the first refractive layer 110 by the cutting member 32.

The cutting member 32 may include cutting portions 32a generally corresponding to the shape of the lens patterns PT that are to be formed. The cutting portions 32a may be portions that are in contact with the surface of the rolling member 31. The distance between the cutting portions 32a may correspond to the distance between the lens patterns PT that are to be formed. According to some exemplary embodiments, the cutting portion 32a may include a substance having high hardness, and may include, for example, diamond.

The rolling member 31 may rotate about a rotating axis. The rolling member 31 may move in a preset direction, and may form a target member (e.g. the molding member 33) to generally correspond to the surface shape of the rolling member 31. According to some exemplary embodiments, the surface of the rolling member 31 may have lower hardness than the cutting portion 32a of the cutting member 32.

The rolling member 31 may be formed by the cutting member 32. The surface of the rolling member 31 may be formed generally in the shape corresponding to that of the cutting portion 32a of the cutting member 32. For example, the surface of the rolling member 31 may include an embossed pattern that is the same as the lens pattern in cross-section (see FIG. 7C).

At the step of forming the molding member 33, the rolling member 31 may form the surface of the molding member 33.

The rolling member 31 may move and rotate in the preset direction, and may form the surface of the molding member 33. According to some exemplary embodiments, the surface of the molding member 33 may have lower hardness than the surface of the rolling member 31.

The rolling member 31 may be moved in one direction by the molding member 33, and may form an intaglio pattern extending in one direction. The intaglio pattern formed on the molding member 33 may correspond to the embossed pattern of the lens pattern PT. At the step of forming the first optical member, the first optical member 110a may be formed into the first refractive layer 110.

The molding member 33 may compress the first optical member 110a to form the first refractive layer 110 having the embossed pattern. The embossed pattern of the first refractive layer 110 may correspond to the intaglio pattern of the molding pattern 33. According to some exemplary embodiments, the first optical member 110a may have lower hardness than the molding member 33. The first optical member 110a may include the aforementioned substance of the first refractive layer 110 by way of example.

In this manner, the first optical member 110a may be formed to become the first refractive layer 110 including the lens patterns PT. Subsequently, after the lens patterns PT of the first refractive layer 110 are formed, the second refractive layer 120 may be formed.

However, the process of forming the lens patterns PT is not limited thereto. According to another exemplary embodiment, after the intaglio pattern (generally the same shape as the intaglio pattern of the second refractive layer 120) is formed on the rolling member 31 using the cutting member 32, the embossed pattern (generally the same shape as the intaglio pattern of the first refractive layer 110) is formed on the molding member 33 using the rolling member 31, and the second optical member is compressed using the molding member 33 to form the second refractive layer 120 having the intaglio pattern, the first optical member may be formed into the first refractive layer 110 having generally the shape of the lens patterns PT using the second refractive layer 120.

When the lens patterns PT of the first refractive layer 110 are formed in this manner, manufacturing cost and processing time may be reduced, and the possibility that the lens patterns PT are asymmetrically manufactured may be reduced.

Next, the method of determining the shape of the lens patterns PT will be described.

Figure 8:
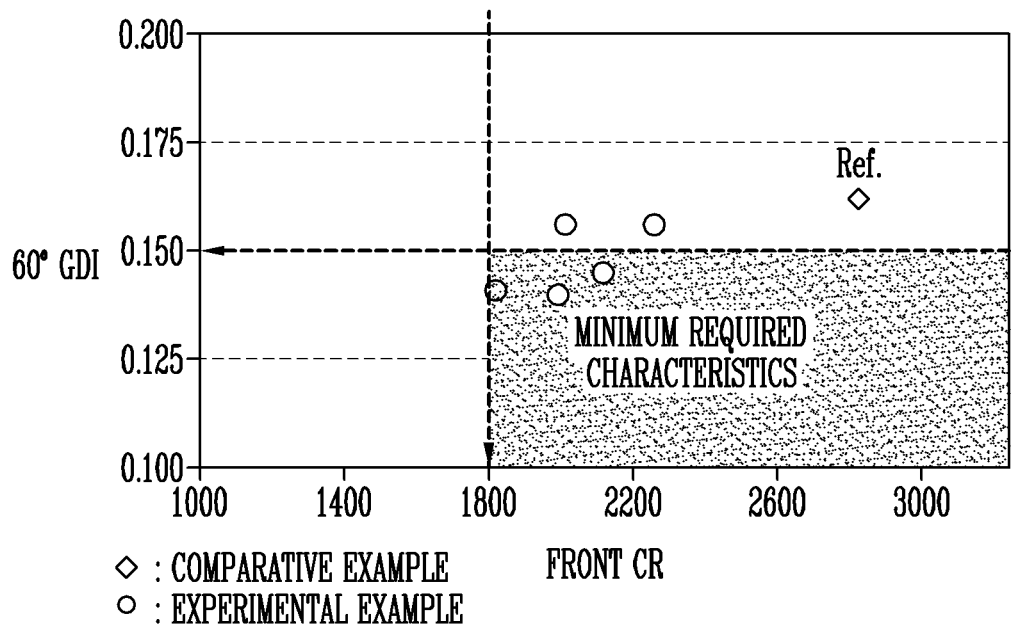
FIG. 8 is a graphical depiction illustrating a front contrast ratio and a 60° viewing-angle gamma distortion index of exemplary and comparative examples.
Figure 9:
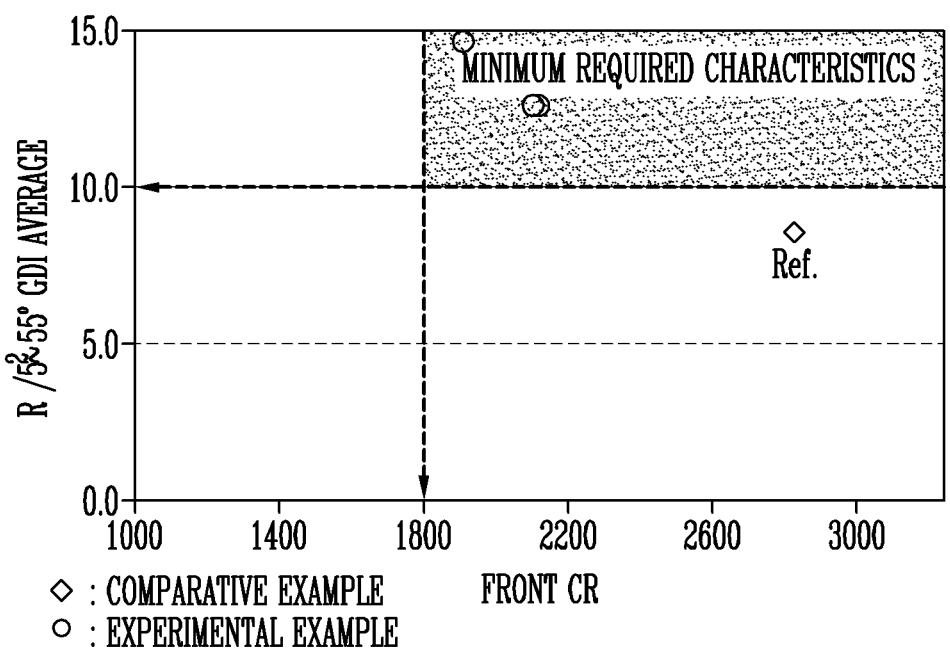
FIG. 9 is a graphical depiction illustrating the front contrast ratio and R2/(5° to 60° viewing-angle gamma distortion index average) of exemplary and comparative examples.
Figure 10:
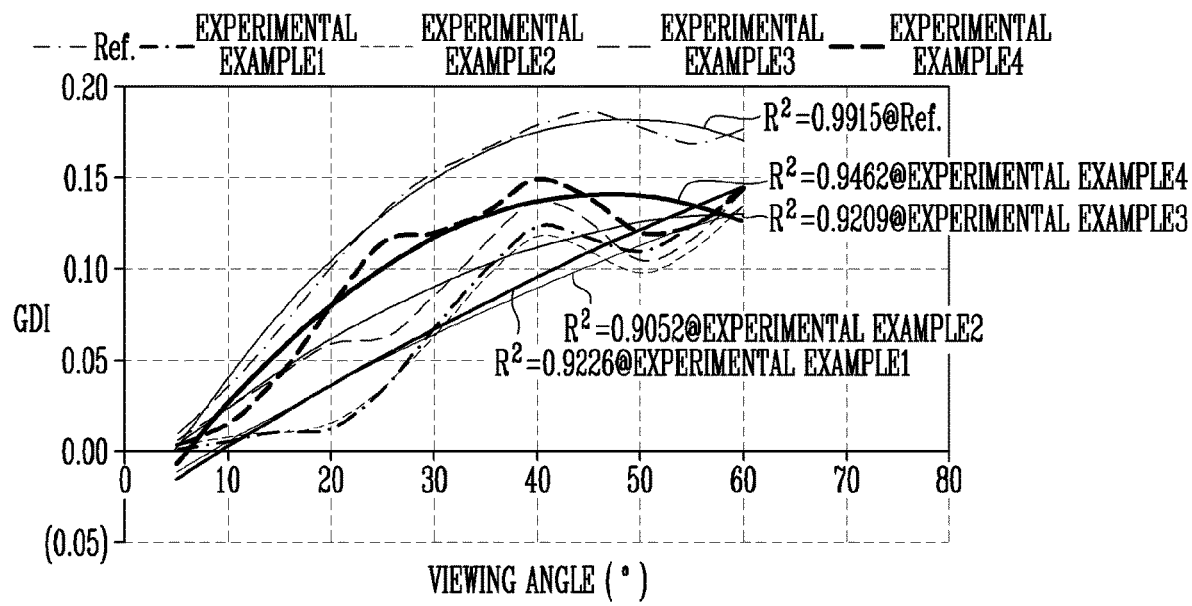
FIG. 10 is a graphical depiction illustrating the viewing angle and viewing-angle gamma distortion index of exemplary and comparative examples.

FIG. 8 is a graphical depiction illustrating a front contrast ratio and a 60° viewing-angle gamma distortion index of exemplary and comparative examples. FIG. 9 is a graphical depiction illustrating the front contrast ratio and R2/(5° to 60° viewing-angle gamma distortion index average) of exemplary and comparative examples. FIG. 10 is a graphical depiction illustrating the viewing angle and viewing-angle gamma distortion index of exemplary and comparative examples.

The experimental Examples in FIGS. 8 and 9 and experimental Examples 1-4 are exemplary embodiments of the invention as depicted in, e.g., FIG. 1. Hereinafter, GDI denotes the viewing-angle gamma distortion index. The GDI was calculated based on luminance data obtained by a luminance meter. The luminance meter may be a device, e.g., sold under the trade designation CA210 of Konica Minolta, Inc. of Tokyo, Japan, or sold under the trade designation BM5A or BM7 of Topcon Corporation of Tokyo, Japan. The GDI for each specific angle has been calculated based on luminance data acquired by the luminance meter located in the specific angle position with respect to the display direction of the display device 1. For example, the 60° viewing-angle gamma distortion index described below represents the distortion degree when viewing the display device 1 at a 60° angle from an imaginary straight line traveling in the display direction (the third direction DR3) as compared to when viewing the display device 1 from the front. A value R2 was calculated as a trend line of the GDI graph versus the viewing angle. The contrast ration CR denotes a ratio of black to full white. The CR may be calculated based on data obtained by the luminance meter.

Referring to FIG. 10, R2 calculated along the trend line of the GDI graph versus the viewing angle may be lower in the experimental examples compared to the comparative example. According to the exemplary experimental examples, R2 is about 0.9226 in experimental example 1, R2 is about 0.9052 in experimental example 2, R2 is about 0.9209 in experimental example 3, and R2 is about 0.9462 in experimental example 4, whereas R2 is about 0.9915 in the comparative example.

The optical film 10 according to some exemplary embodiments may simultaneously satisfy the minimum required characteristics set in the graph of FIG. 8 and the graph of FIG. 9. The minimum required characteristics of the optical film 10 may be set to simultaneously satisfy the front CR of 1800 or more, 60° GDI of 0.150 or less, and R2/(5° to 60° viewing-angle gamma distortion index average) of 10.0 or more.

As shown in FIG. 8, the exemplary embodiments of the optical film 10 may be first selected as experimental examples having the following specification: the front CR of 1800 or more and the 60° GDI of no more than about 0.150. As shown in FIG. 9, the exemplary embodiments may be selected as experimental examples having the following specification: R2/(5° to 60° viewing-angle gamma distortion index average) of at least about 10.0. The comparative example (Ref) illustrated in FIGS. 8 and 9 shows the result of the optical film 10 in which the formed lens patterns PT have generally the same shape.

Some experimental examples satisfied the minimum required characteristics. Some other embodiments did not satisfy the minimum required characteristics. However, the front CR, 60° GDI, and R2/(5° to 60° viewing-angle gamma distortion index average) of most of the experimental examples are improved compared to the comparative example (Ref.).

Next, the optical film or the display panel according to another exemplary embodiment will be described. Hereinafter, repetitive description of the components shown in FIGS. 1 to 10 will be omitted herein to avoid redundancy, and the same or similar reference numerals are used.

Figure 11:
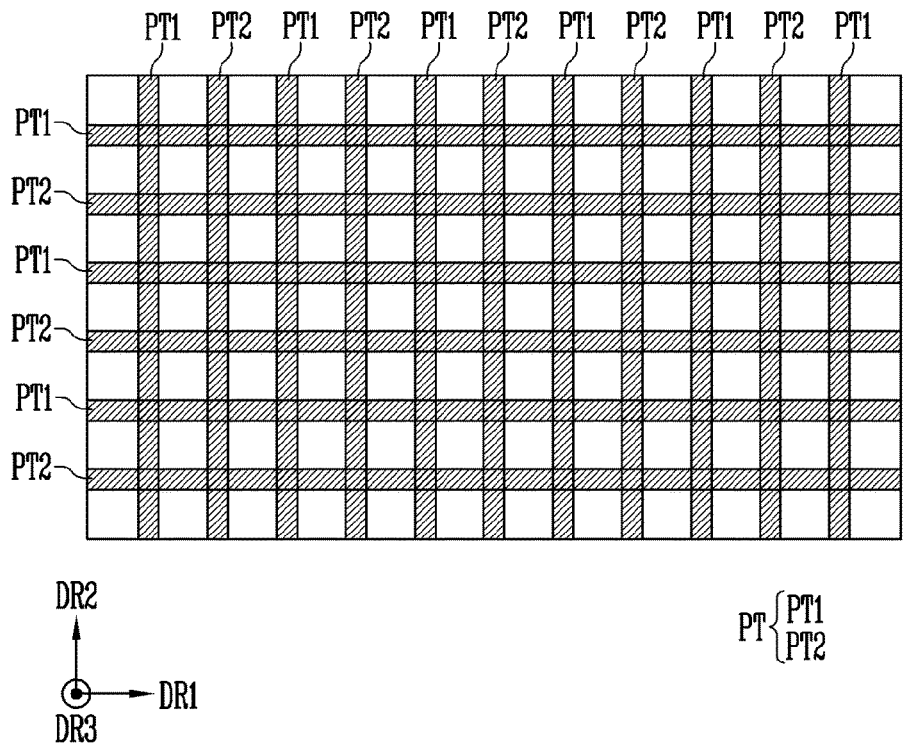
FIGS. 11 and 12 are plan views illustrating exemplary embodiments of optical films constructed according to principles of the invention.
Figure 12:
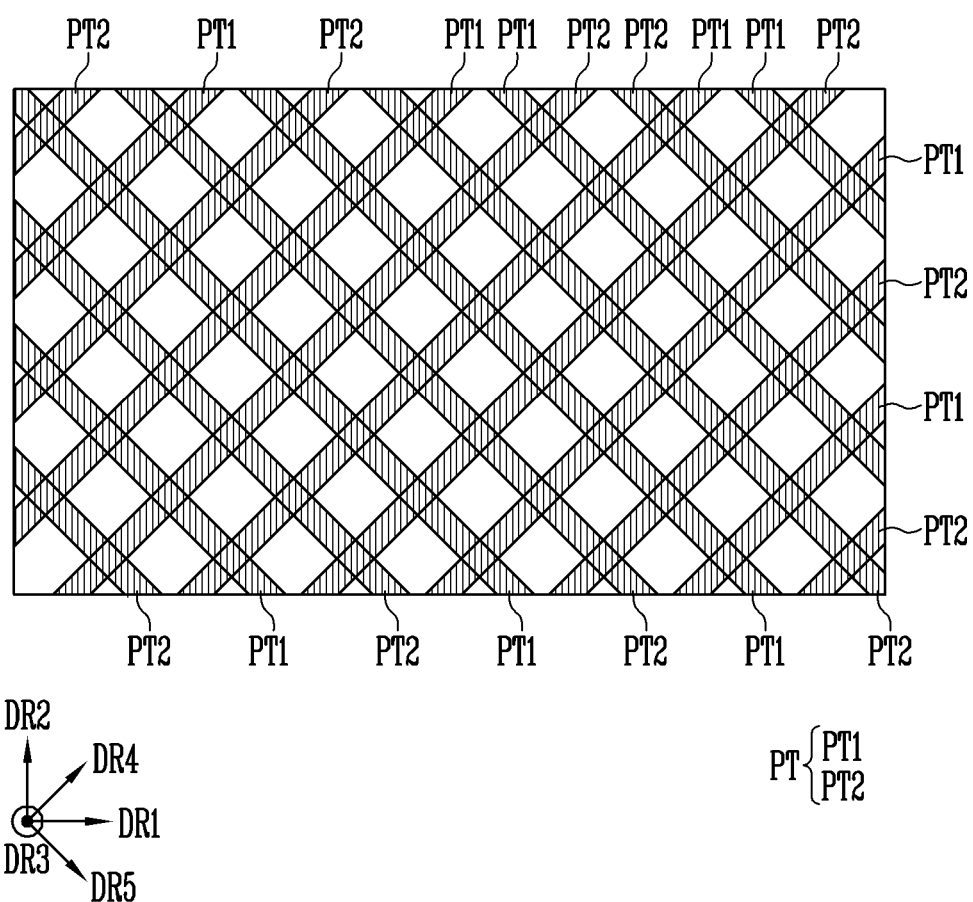

FIGS. 11 and 12 are plan views illustrating exemplary embodiments of optical films constructed according to principles of the invention. Unlike the optical film 10 according to the exemplary embodiment of FIG. 2, the optical films 10_1 and 10_2 according to the exemplary embodiments of FIGS. 11 and 12 may be formed such that the lens patterns PT extend in different directions when viewed in plan.

Referring to FIG. 11, the optical film 10_1 may include the lens patterns PT extending in the first direction DR1 and the lens patterns PT extending in the second direction DR2.

The lens patterns PT may be divided into parts to extend in the first direction DR1 and in the second direction DR2. According to some exemplary embodiments, the lens patterns PT extending in the first direction DR1 may include the first lens pattern PT1 and the second lens pattern PT2. The first lens pattern PT1 and the second lens pattern PT2 extending in the first direction DR1 may be alternately arranged in the second direction DR2. Here, the lens patterns may be arranged with a predetermined spacing distance or continuously arranged without a gap therebetween.

The lens patterns PT extending in the second direction DR2 may also be arranged in the first direction DR1. According to some exemplary embodiments, the lens patterns PT extending in the second direction DR2 may include the first lens pattern PT1 and the second lens pattern PT2. The first lens pattern PT1 and the second lens pattern PT2 extending in the second direction DR2 may be alternately arranged in the first direction DR1. Here, the lens patterns may be arranged with a predetermined distance or continuously arranged without a gap therebetween.

Although the drawings show that six lens patterns PT extending in the first direction DR1 eleven lens patterns PT extending in the second direction DR2, any suitable number of lens patterns may be utilized and this is merely an illustrative implementation.

According to some exemplary embodiments, a horizontal viewing angle as well as a vertical viewing angle of the display device may be improved.

Referring to FIG. 12, the optical film 10_2 may include the lens patterns PT formed in a mesh form.

The optical film 10_2 may include lens patterns PT extending in a fourth direction DR4 inclined relative to the first direction DR1 and the second direction DR2, and lens patterns PT also extending in a fifth direction DR5 crossing the fourth direction DR4.

The lens patterns PT extending in the fourth direction DR4 may be also arranged in the fifth direction DR5. According to some exemplary embodiments, the lens patterns PT extending in the fourth direction DR4 may include the first lens pattern PT1 and the second lens pattern PT2. The first lens pattern PT1 and the second lens pattern PT2 extending in the fourth direction DR4 may also be alternately arranged in the fifth direction DR5. Here, the lens patterns may be arranged with a predetermined spacing distance or continuously arranged without a gap therebetween.

The lens patterns PT extending in the fifth direction DR5 may be arranged in the fourth direction DR4. According to some exemplary embodiments, the lens patterns PT extending in the fifth direction DR5 may include the first lens pattern PT1 and the second lens pattern PT2. The first lens pattern PT1 and the second lens pattern PT2 extending in the fifth direction DR5 may be also alternately arranged in the fourth direction DR4. Here, the lens patterns may be arranged with a predetermined distance or continuously arranged without a gap therebetween.

The exemplary embodiments are not limited to the number of lens patterns PT extending in the fourth direction DR4 and the number of lens patterns PT extending in the fifth direction DR5, which are shown in the drawings, as any suitable number of lens patterns may be utilized.

Figure 13:
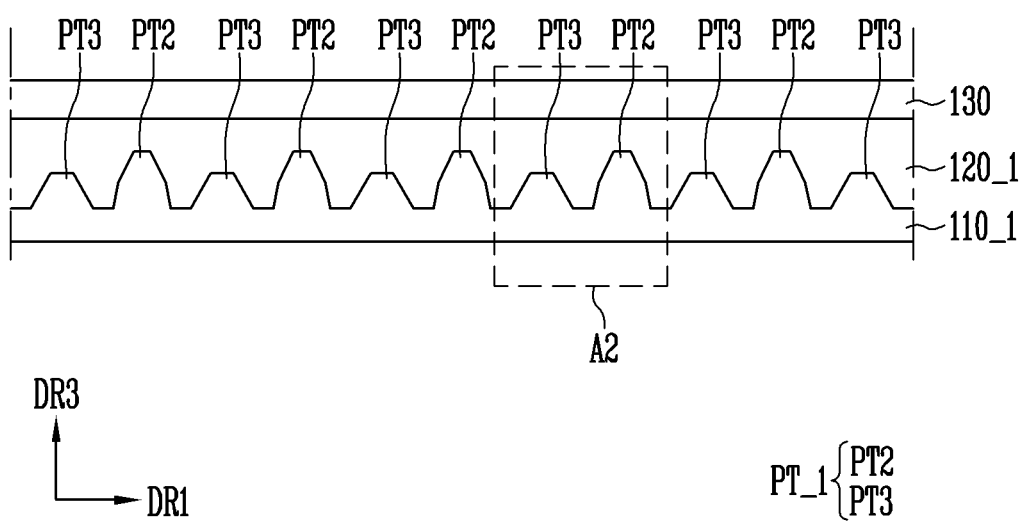
FIG. 13 is a cross-sectional view illustrating another exemplary embodiment of an optical film constructed according to principles of the invention.
Figure 14:
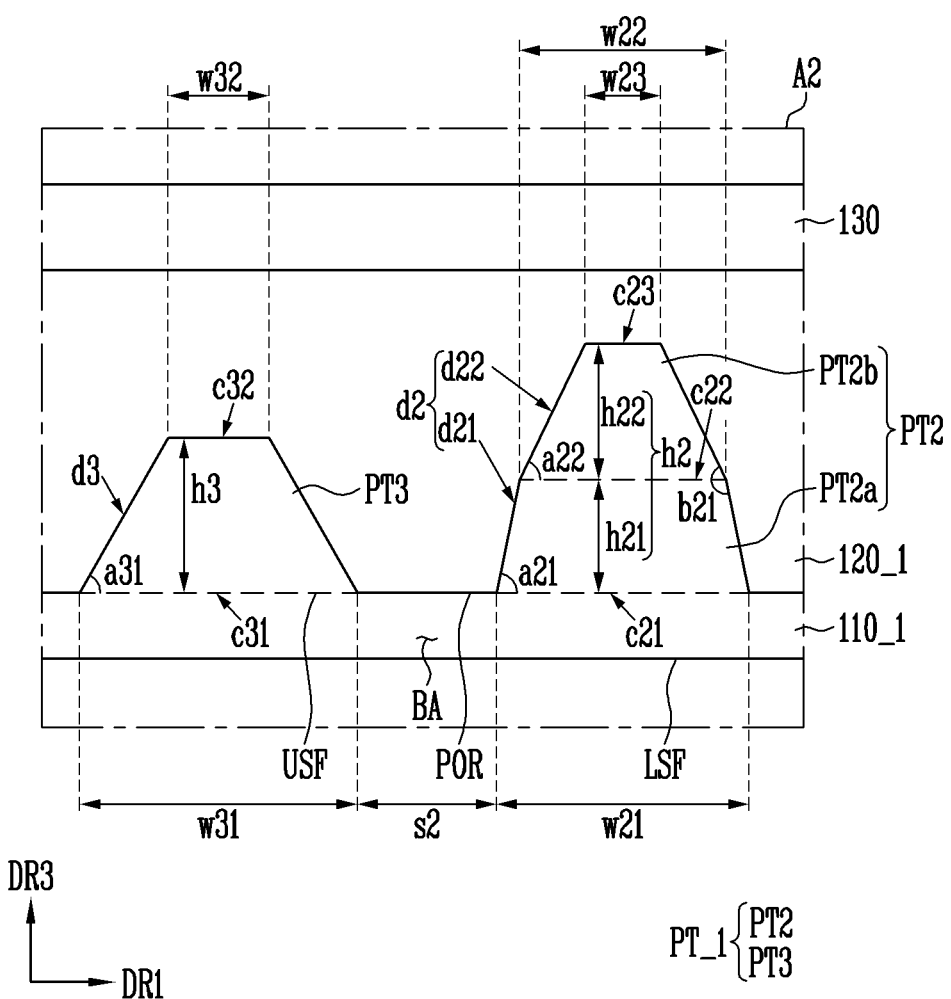
FIG. 14 is an enlarged cross-sectional view of area A2 of FIG. 13.

FIG. 13 is a cross-sectional view illustrating another exemplary embodiment of an optical film constructed according to principles of the invention. FIG. 14 is an enlarged cross-sectional view of area A2 of FIG. 13.

Referring to FIGS. 13 and 14, the optical film 10_3 according to this embodiment is different from the optical film 10 according to the exemplary embodiment of FIGS. 3 and 4 in that it includes a third lens pattern PT3 having one protruding area, in lieu of the first lens pattern PT1.

According to some exemplary embodiments, the optical film 10 may include the second lens pattern PT2 and the third lens pattern PT3 formed on the first refractive layer 110_1. The third lens pattern PT3 formed on the first refractive layer 110_1 may be the embossed pattern protruding from the base area BA.

According to some exemplary embodiments, the upper surface of the third lens pattern PT3 may be generally parallel to the upper surface USF of the base area BA. A surface of the third lens pattern PT3 overlapping an imaginary plane including the upper surface USF of the base area BA may be defined as a lower surface of the third lens pattern PT3.

In the cross-section, the upper side c32 of the third lens pattern PT3 may be one side included in the upper surface of the third lens pattern PT3, and the lower side c31 of the third lens pattern PT3 may be one side included in the lower surface of the third lens pattern PT3.

The third lens pattern PT3 may include the lateral side d3 connecting the upper side c32 with the lower side c31. According to some exemplary embodiments, the lateral side d3 may include one side. According to some exemplary embodiments, the lateral side d3 may form an angle of about 68° to about 90° with the lower side c31, with respect to an internal angle a31 in the third lens pattern PT3.

The third lens pattern PT3 includes one lateral side and the other lateral side connecting the upper side c32 with the lower side c31 in the first direction DR1. The one lateral side and the other lateral side have a line symmetry relationship with respect to the imaginary line extending in the third direction DR3. Therefore, in the following description, it will be understood that the lateral sides d3 refer to any one of one lateral side and the other lateral side, and the shape of a remaining one has the line symmetry relationship with respect to the imaginary line extending in the third direction DR3. Each lateral side d3 of the third lens pattern PT3 may be referred to as a fifth side.

Both the lateral sides d3, the upper side c32, and the lower side c31 in the third lens pattern PT3 may define a fifth protruding area. The third lens pattern PT3 includes the fifth protruding area. The fifth protruding area may have a generally trapezoidal shape. Precisely, the fifth protruding area may have a generally isosceles trapezoidal shape. According to some exemplary embodiments, the fifth protruding area may have a generally rectangular shape. In the exemplary embodiment wherein the fifth protruding area has the generally rectangular shape, the widths w31 and w32 of the upper and lower sides c32 and c31 of the third lens pattern PT3 may be equal to each other.

The height h3 of the third lens pattern PT3 corresponds to the height of the fifth protruding area. According to some exemplary embodiments, the height h3 of the third lens pattern PT3 may be about 6 μm to about 12 μm. Furthermore, the width 32 of the upper side c32 of the third lens pattern PT3 may be about 5 μm to about 8 μm, and the width 32 of the lower side c31 of the third lens pattern PT3 may be about 5 μm to about 10 μm.

The second lens pattern PT2 and the third lens pattern PT3 may be alternately arranged in the first direction DR1. The second lens pattern PT2 and the third lens pattern PT3 may be continuously arranged without a gap therebetween, or may be arranged to have a predetermined spacing distance s2. When the predetermined spacing distance s2 is provided between the second lens pattern PT2 and the third lens pattern PT3, the spacing distance s2 may be about 3 μm to about 6 μm.

Figure 15:
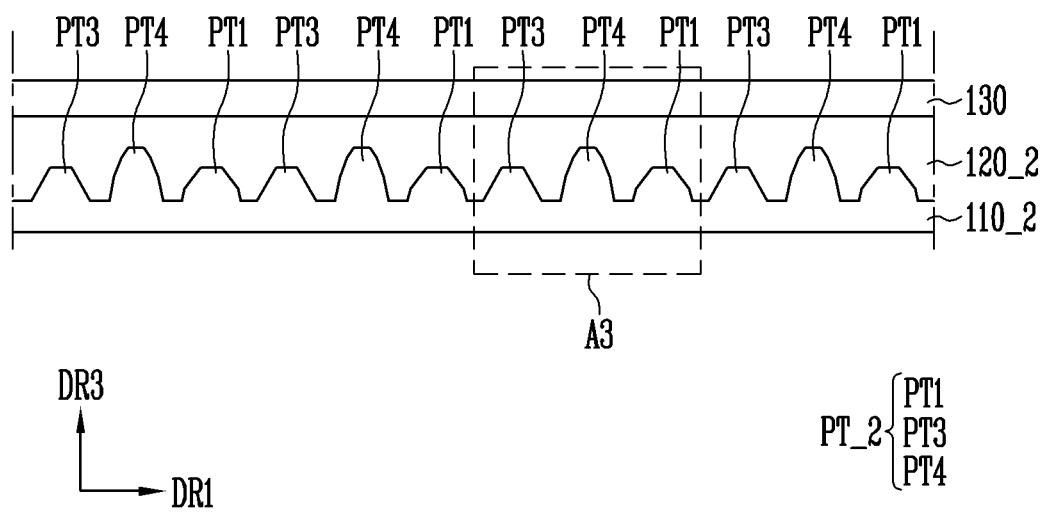
FIG. 15 is a cross-sectional view illustrating another exemplary embodiment of an optical film constructed according to principles of the invention.
Figure 16:
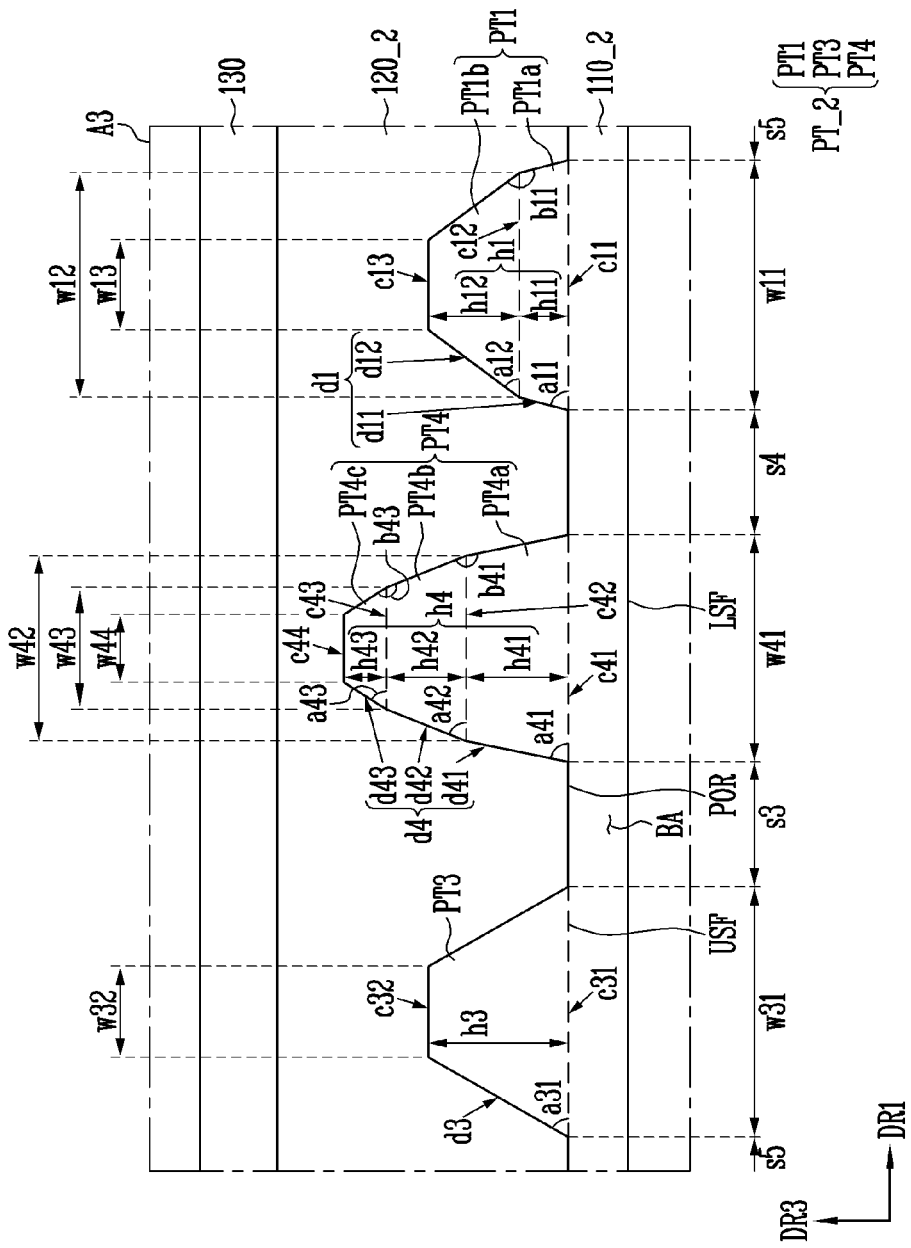
FIG. 16 is an enlarged cross-sectional view of area A3 of FIG. 15.

FIG. 15 is a cross-sectional view illustrating another exemplary embodiment of an optical film constructed according to principles of the invention. FIG. 16 is an enlarged cross-sectional view of area A3 of FIG. 15.

Referring to FIGS. 15 and 16, the optical film 10_4 according to this embodiment is different from the optical film 10 according to the exemplary embodiment of FIGS. 3 and 4 in that it includes three types of lens patterns PT_2 having different shapes.

According to some exemplary embodiments, the shape of the optical film 10_4 may include a first lens pattern PT1, a third lens pattern PT3, and a fourth lens pattern PT4 having different shapes. Since the above description of the exemplary embodiments is applied to the description of the first lens pattern PT1 and the third lens pattern PT3, a repetitive description thereof will be omitted herein to avoid redundancy.

The first refractive layer 110_2 may include the fourth lens pattern PT4 protruding from the base area BA. According to some exemplary embodiments, the upper surface of the fourth lens pattern PT4 may be generally parallel to the upper surface USF of the base area BA. A surface of the fourth lens pattern PT4 overlapping an imaginary plane including an upper surface USF of the base area BA may be defined as a lower surface of the fourth lens pattern PT4.

In the cross-section, the upper side c44 of the fourth lens pattern PT4 may be one side included in the upper surface of the fourth lens pattern PT4, and the lower side c41 of the fourth lens pattern PT4 may be one side included in the lower surface of the fourth lens pattern PT4.

The fourth lens pattern PT4 may include the lateral side d4 connecting the upper side c44 with the lower side c41. The lateral side d4 may include a plurality of sides d41, d42, and d43 extending in different directions. As the arrangement direction of the plurality of sides d41, d42, and d43 proceeds upwardly in the third direction DR3, the inclination angle may be decreased with respect to the internal angles (inclination angles) a41, a42, and a43 of the fourth lens pattern PT4 with the respective lower side c41. That is, as the arrangement direction of the plurality of sides d41, d42, and d43 proceeds in the third direction DR3, the inclination may decrease. According to some exemplary embodiments, the plurality of sides d41, d42, and d43 may form an angle of about 68° to about 90° with the lower side c41.

According to some exemplary embodiments, internal angles b41 and b43 between adjacent sides (e.g. d41 and d42, d42 and d43) at the lateral side d4 of the fourth lens pattern PT4 may be less than about 180°.

The fourth lens pattern PT4 includes one lateral side and the other lateral side connecting the upper side c44 with the lower side c41 in the first direction DR1. The one lateral side d4 and the other lateral side have a line symmetry relationship with respect to the imaginary line extending in the third direction DR3. Therefore, in the following description, it will be understood that the lateral sides d4 refer to any one of one lateral side and the other lateral side, and the shape of a remaining one has the line symmetry relationship with respect to the imaginary line extending in the third direction DR3.

The lateral side d4 of the fourth lens pattern PT4 may include the sixth side d41, the seventh side d42, and the eighth side d43 extending in different directions. For example, the sixth side d41 may be defined as the side adjacent to the lower side c41 of the fourth lens pattern PT4, the eighth side d43 may be defined as the side adjacent to the upper side c13 of the first lens pattern PT1, and the seventh side d42 may be defined as the side connecting the sixth side d41 with the eighth side d43. That is, the sixth side d41 may be in contact with the seventh side d42, and the seventh side d42 may be in contact with the eighth side d43.

The internal angle a41 between the sixth side d41 of the fourth lens pattern PT4 and the lower side c41 may be larger than the internal angle a42 between the seventh side d42 and the lower side c41, and the internal angle a42 between the seventh side d42 and the lower side c41 may be larger than the internal angle a43 between the eighth side d43 and the lower side c41. That is, as the arrangement direction of the plurality of sides d41, d42, and d43 proceeds in the third direction DR3, the inclination may decrease. The internal angles a41, a42, and a43 of the sixth side d41, the seventh side d42, and the eighth side d43 relative to the lower side c41 may be variously selected within the range of about 68° to about 90°.

The imaginary side c42 including points where the sixth and seventh sides d41 and d42 on both lateral sides d4 in the fourth lens pattern PT4 are in contact with each other, the lower side c41, and both the sixth sides d41 may define a sixth protruding area PT4a. The imaginary side c43 including points where the seventh and eighth sides d42 and d43 on both lateral sides d4 in the fourth lens pattern PT4 are in contact with each other, the imaginary side c42 including the points where the sixth and seventh sides d41 and d42 are in contact with each other, and both the seventh sides d42 may define a seventh protruding area PT4b. The imaginary side c43 including the points where the seventh and eighth sides d42 and d43 on both the lateral sides d4 in the fourth lens pattern PT4 are in contact with each other, the upper side c44, and both the eighth sides d43 may define an eighth protruding area PT4c. That is, the fourth lens pattern PT4 may include three protruding areas PT4a, PT4b, and PT4c.

The height h4 of the fourth lens pattern PT4 is equal to the sum of the height h41 of the sixth protruding area PT4a, the height h42 of the seventh protruding area PT4b, and the height h43 of the eighth protruding area PT4c. The height h4 of the fourth lens pattern PT4 may be equal to or less than the height of the second refractive layer 120_2, and may be about 7 μm to about 16 μm. The heights h41, h42, and h43 of the sixth, seventh, and eighth protruding area PT4a, PT4b, and PT4c may be equal to or different from each other. The height h4 of the fourth lens pattern PT4 may be different from the height h1 of the first lens pattern PT1 or the height h3 of the third lens pattern PT3. According to some exemplary embodiments, the height h1 of the first lens pattern PT1, the height h3 of the third lens pattern PT3, and the height h4 of the fourth lens pattern PT4 may be different from each other.

The width w43 of the upper side c44 of the fourth lens pattern PT4 is formed to be smaller than the width w41 of the lower side c41. The width w43 of the upper side c44 of the fourth lens pattern PT4 may be about 2 μm to about 6 μm, while the width w41 of the lower side c41 of the fourth lens pattern PT4 may be about 7 μm to about 11 μm.

The third lens pattern PT3, the fourth lens pattern PT4, and the first lens pattern PT1 may be arranged in the first direction DR1, and the third lens pattern PT3, the fourth lens pattern PT4, and the first lens pattern PT1 may be repeated. This is merely an exemplary implementation, and the arrangement order may be determined in various combinations.

The third lens pattern PT3, the fourth lens pattern PT4, and the first lens pattern PT1 may be continuously arranged without a gap therebetween, or arranged to have a predetermined spacing distance. When the lens patterns are arranged to have the predetermined spacing distance, the spacing distance s3 between the third lens pattern PT3 and the fourth lens pattern PT4 may be about 3 μm to about 6 μm, the spacing distance s4 between the fourth lens pattern PT4 and the first lens pattern PT1 may be about 3 µm to about 6 µm, and the spacing distance s5 between the first lens pattern PT1 and the third lens pattern PT3 may be about 3 µm to about 6 µm. The above-described spacing distances s3, s4, and s5 may be equal to or different from each other.

Figure 18A:
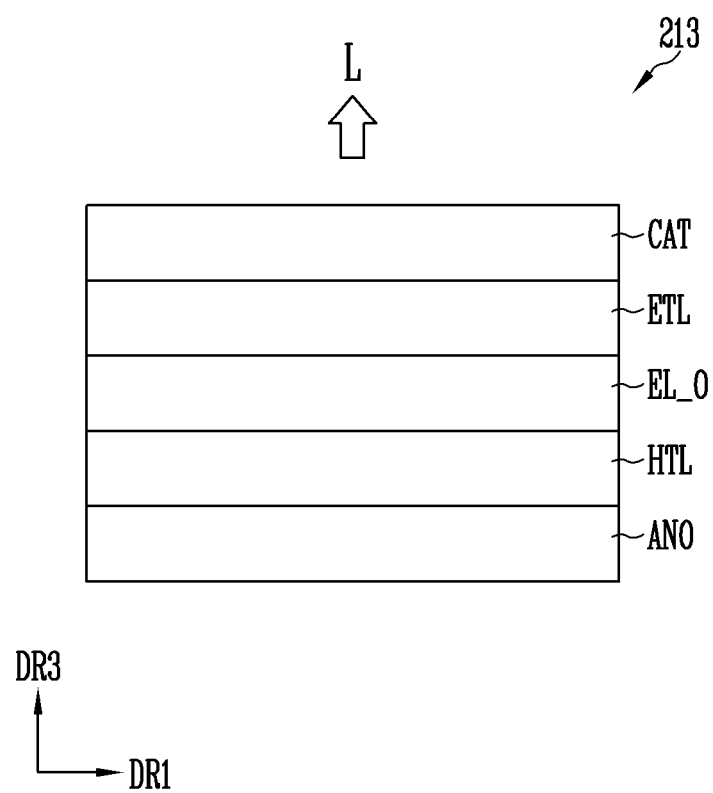
FIG. 18A is a cross-sectional view illustrating an exemplary embodiment of the light-emitting-element layer of FIG. 17.
Figure 18B:
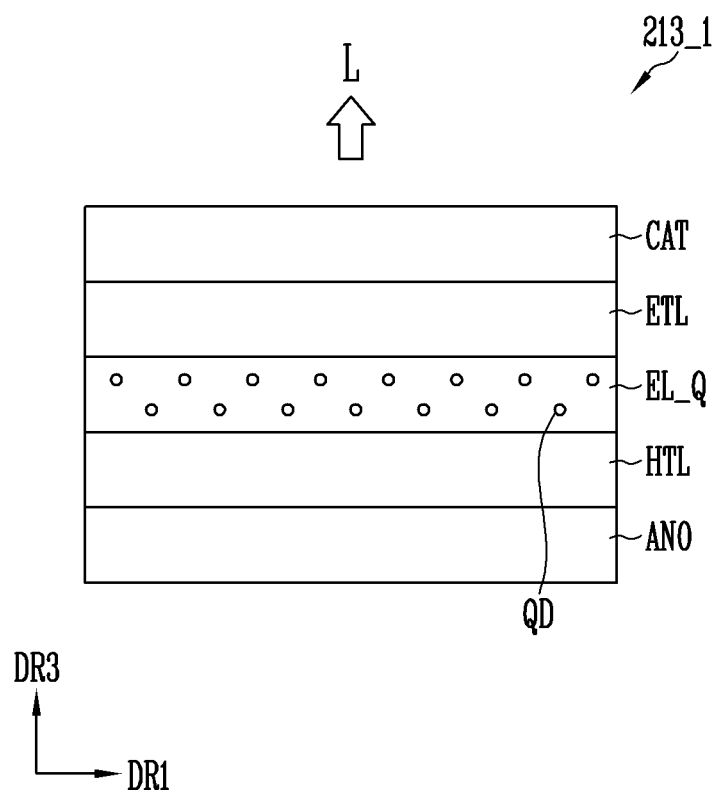
FIG. 18B is a cross-sectional view illustrating another exemplary embodiment of the light-emitting-element layer of FIG. 17.

FIG. 17 is a cross-sectional view illustrating another exemplary embodiment of a display panel constructed according to principles of the invention. FIG. 18A is a cross-sectional view illustrating an exemplary embodiment of the light-emitting-element layer of FIG. 17. FIG. 18B is a cross-sectional view illustrating another exemplary embodiment of the light-emitting-element layer of FIG. 17.

Referring to FIGS. 17 to 18B, the display panel 20_1 according to this exemplary embodiment is different from the display panel 20 according to the exemplary embodiment of FIG. 6 in that it includes a light-emitting-element layer 213 having a self-emission element.

First, the display panel 20_1 according to this exemplary embodiment will be described with reference to FIGS. 17 and 18A.

According to some exemplary embodiments, the display panel 20_1 may include a first substrate 211, a TFT circuit layer 212, a light-emitting-element layer 213, an encapsulation layer 214, an input sensing layer 215, and a second substrate 216.

The first substrate 211 may be a rigid substrate or a flexible substrate. If the first substrate 211 is a rigid substrate, it may be one of a glass substrate, a quartz substrate, a glass ceramic substrate, and a crystalline glass substrate. If the first substrate 211 is the flexible substrate, it may be either of a film substrate containing a polymer organic matter and a plastic substrate. Furthermore, the first substrate 211 may contain a fiber glass reinforced plastic (FRP). The first substrate 211 may be a lower substrate of the display panel 20_1. According to some exemplary embodiments, the first substrate 211 may be an opaque substrate.

A TFT circuit layer 212 may be disposed on the first substrate 211.

A plurality of switching elements may be disposed on the TFT circuit layer 212. The switching element may be a thin film transistor. The TFT circuit layer 212 may include at least one conductor, the semiconductor layer, and a plurality of insulation layers.

The light-emitting-element layer 213 may be disposed on the TFT circuit layer 212.

According to some exemplary embodiments, the light-emitting-element layer 213 may include an organic light-emitting diode that is a self-emission element. The light-emitting-element layer 213 may be formed by sequentially stacking a first pixel electrode ANO, a hole transport layer HTL, an organic light-emitting layer EL_O, an electron transport layer ETL, and a second pixel electrode CAT.

The first pixel electrode ANO may be made of a substance having a high work function. The first pixel electrode ANO may contain indium-tin-oxide (ITO), indium-zinc-oxide (IZO), zinc oxide (ZnO), indium oxide (In2O3), etc. The first pixel electrode ANO may be electrically connected to a source or drain electrode of the thin film transistor disposed on the TFT circuit layer 212.

The second pixel electrode CAT may be made of a substance having a low work function. The second pixel electrode CAT may contain Li, Ca, LiF/Ca, LiF/Al, Al, Mg, Ag, Pt, Pd, Ni, Au Nd, Ir, Cr, BaF, Ba or a compound or mixture thereof (e.g. a mixture of Ag and Mg).

The encapsulation layer 214 may be disposed on the light-emitting-element layer 213.

According to some exemplary embodiments, the encapsulation layer 214 includes an inorganic film and/or an organic film. The first encapsulation layer 214 may include a plurality of lamination films. The first encapsulation layer 214 may be composed of a multi-layered film including the first inorganic film, the organic film, and the second inorganic film which are sequentially stacked.

According to other exemplary embodiments, the encapsulation layer 214 may be provided in the form of the encapsulation substrate.

The input sensing layer 215 may be disposed on the encapsulation layer 214.

The input sensing layer 215 may include a plurality of sensing electrodes. The plurality of sensing electrodes may detect touch, hovering, gesture, and proximity by a user's body. The sensing electrodes may be configured in different shapes in various types, such as a resistive type, a capacitive type, an electro-magnetic type (EM), or an optical type. For example, if the sensing electrodes are configured in the capacitive type, the sensing electrodes may be configured in a self-capacitive type, a mutual-capacitive type, etc.

The plurality of sensing electrodes may contain a transparent conductive substance such as indium tin oxide (ITO), indium zinc oxide (IZO), zinc oxide (ZnO), or indium tin zinc oxide (ITZO), or may contain one or more opaque conductive substances selected from a group consisting of molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), and copper (Cu).

In some exemplary embodiments, the input sensing layer 215 may be omitted.

The second substrate 216 may be disposed on the input sensing layer 215. The second substrate 216 may be a window substrate.

Referring to FIG. 18B, the light-emitting-element layer 213_1 may be transformed into a quantum-dot light-emitting diode.

According to some exemplary embodiments, the light-emitting-element layer 213_1 may be formed by sequentially stacking the first pixel electrode ANO, the hole transport layer HTL, the quantum-dot emission layer EL_Q, the electron transport layer ETL, and the second pixel electrode CAT.

The light-emitting-element layer 213_1 contains a light-emitting semiconductor substance to display a specific color. For example, the light-emitting-element layer 213_1 may display primary colors such as blue, green or red, and a combination thereof.

The light-emitting semiconductor substance may contain quantum dots QD. The light-emitting-element layer 213_1 may contain one or more selected from a group consisting of red quantum dots having the wavelength of an emission area ranging from about 570 nm to about 780 nm, green quantum dots having the wavelength of an emission area ranging from about 480 nm to about 570 nm, and blue quantum dots having the wavelength of an emission area ranging from about 380 nm to about 480 nm.

The quantum dots QD may include a II-VI group compound, a III-V group compound, a IV-VI group compound, a IV group compound, and a combination thereof. The II-VI group compound may be selected from a group consisting of a binary compound of CdSe, CdTe, ZnS, ZnSe, ZnTe, ZnO, HgS, HgSe, HgTe, MgSe, MgS, and a mixture thereof, a ternary compound of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof, and a quaternary compound of HgZnTeS, CdZnSeS, CdZnSeTe, CdZnSTe, CdHgSeS, CdHgSeTe, CdHgSTe, HgZnSeS, HgZnSeTe, HgZnSTe and a mixture thereof.

The III-V group compound may be selected from a group consisting of a binary compound of GaN, GaP, GaAs, GaSb, AlN, AlP, AlAs, AlSb, InN, InP, InAs, InSb and a mixture thereof, a ternary compound of GaNP, GaNAs, GaNSb, GaPAs, GaPSb, AlNP, AlNAs, AlNSb, AlPAs, AlPSb, InNP, InNAs, InNSb, InPAs, InPSb, and a mixture thereof, and a quaternary compound of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, GaAlNP and a mixture thereof.

The III-V group compound may be selected from a group consisting of a binary compound of GaN, GaP, GaAs, GaSb, AlN, AlP, AlAs, AlSb, InN, InP, InAs, InSb and a mixture thereof, a ternary compound of GaNP, GaNAs, GaNSb, GaPAs, GaPSb, AlNP, AlNAs, AlNSb, AlPAs, AlPSb, InNP, InNAs, InNSb, InPAs, InPSb, and a mixture thereof, and a quaternary compound of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, GaAlNP and a mixture thereof.

The IV-VI group compound may be selected from a group consisting of a binary compound of SnS, SnSe, SnTe, PbS, PbSe, PbTe and a mixture thereof, a ternary compound of SnSeS, SnSeTe, SnSTe, PbSeS, PbSeTe, PbSTe, SnPbS, SnPbSe, SnPbTe and a mixture thereof, and a quaternary compound of SnPbSSe, SnPbSeTe, SnPbSTe and a mixture thereof.

The binary compound may contain the IV-group element selected from the group consisting of Si, Ge, and a mixture thereof, and the IV-group compound selected from the group consisting of SiC, SiGe, and a mixture thereof. In addition, group II oxide, group III oxide, group VI oxide, group V oxide, or group VI oxide may be included.

FIG. 19 is a sectional view illustrating a display panel in accordance with another embodiment of the present disclosure.

The display panel 20_2 according to the exemplary embodiment shown in FIG. 19 is different from the display panel 20_1 according to the exemplary embodiment shown in FIG. 17 in that the display panel 20_2 further includes a color conversion layer 217 and a wavelength conversion layer 218.

According to some exemplary embodiments, the display panel 20_2 may include a first substrate 211, a TFT circuit layer 212, a light-emitting-element layer 213, an encapsulation layer 214, a color conversion layer 217, a wavelength conversion layer 218, an input sensing layer 215, and a second substrate 216.

According to some exemplary embodiments, the light-emitting-element layer 213 may emit blue light having the wavelength range of about 450 nm to about 495 nm.

The color conversion layer 217 and the wavelength conversion layer 218 may be disposed on the encapsulation layer 214. According to some exemplary embodiments, the color conversion layer 217 may be disposed on the encapsulation layer 214, and the wavelength conversion layer 218 may be disposed on the color conversion layer 217. However, the order of stacking the color conversion layer 217 and the wavelength conversion layer 218 may be changed without being limited thereto.

The color conversion layer 217 may include color filters. The color filter optionally transmits the light of a specific color and absorbs light of another color to block the progress of the light. The light passing through the color filter may display one of three primary colors including red, green and blue. However, the display color of the light passing through the color filter is not limited to primary colors, but may display any one of cyan, magenta, yellow, and white.

Since the color filter absorbs a considerable amount of external light, it is possible to reduce the reflection of the external light without additional polarizing plates or the like.

The wavelength conversion layer 218 may include the wavelength conversion pattern. The wavelength conversion pattern may convert incident light of a peak wavelength into light of a specific peak wavelength to emit the light. The light passing through the wavelength conversion pattern may display three primary colors including red, green and blue. However, the display color of light passing through the wavelength conversion pattern is not limited to primary colors, but may display any one of cyan, magenta, yellow, and white.

The wavelength conversion pattern may include a wavelength conversion substance. Examples of the wavelength conversion substance may include quantum dots. The duplicated description of the quantum dots will be omitted to avoid redundancy.

Some of the wavelength conversion pattern may convert blue light into red light ranging from about 610 nm to about 650 nm to emit the light. The other wavelength conversion pattern may convert blue light into green light ranging from about 510 nm to about 550 nm to emit the light.

According to exemplary embodiments of the invention, the display device with an optical film attached thereto may reduce visibility asymmetry depending on a direction. Furthermore, the display device with an optical film constructed according to exemplary embodiments of the invention attached thereto has an excellent contrast ratio and may improve a viewing-angle gamma distortion index. Moreover, an optical film constructed according to exemplary embodiments of the invention may reduce manufacturing cost and time.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An optical film for a display device, comprising:
a first refractive layer having an upper surface and a lower surface including first projections and second projections extending away from the lower surface in a first direction, the second projections having different heights than the first projections, the first projections having lateral sides with different angles of inclination that decrease in the first direction in which the lateral sides further from the lower surface have a lower angle of inclination than the lateral sides closer to the lower surface, and wherein a top surface of each of the first projections is a flat horizontal surface that has no inclination; and
a second refractive layer disposed directly on the upper surface of the first refractive layer, the second refractive layer having a refractive index different from that of the first refractive layer,
wherein the first projections and the second projections form a first lens pattern and a second lens pattern, respectively, each of which extends in a second direction different from the first direction on a plane, wherein the first lens pattern extending in the second direction and the second lens pattern extending in the second direction are alternately arranged in a third direction crossing the second direction, the third direction different from the first direction, wherein the first lens pattern and the second lens pattern each further extends in the third direction on a plane, and the first lens pattern extending in the third direction and the second lens pattern extending in the third direction are alternately arranged in the second direction, and wherein the first lens pattern extending in the second direction, the second lens pattern extending in the second direction, the first lens pattern extending in the third direction, and the second lens pattern extending in the third direction are disposed in a same layer as each other in the first refractive layer.

2. The optical film according to claim 1, wherein the refractive index of the second refractive layer is greater than the refractive index of the first refractive layer.

3. The optical film according to claim 2, wherein the difference between the refractive index of the first refractive layer and the refractive index of the second refractive layer is at least about 0.1.

4. The optical film according to claim 1, wherein the inclination angle of at least one of the sides is about 68° to about 90°.

5. The optical film according to claim 4, wherein all of the lateral sides have an internal angle between adjacent sides of no more than about 180°.

6. The optical film according to claim 1, wherein the height of the first projections is about 7 µm to about 16 µm.

7. The optical film according to claim 1, wherein the first lens pattern and the second lens pattern are disposed continuously without a gap therebetween.

8. The optical film according to claim 1, wherein each of the first lens pattern and the second lens pattern has a ratio of height to width of about 0.5 to about 3.

9. The optical film according to claim 1, wherein at least some of the second projections comprise lateral sides having different angles of inclination that decrease in the first direction away from the lower surface.

10. The optical film according to claim 9, wherein the lateral sides of the second projections comprises a single side, and an inclination angle of the single side is about 68° to about 90°.

11. The optical film according to claim 1, wherein the first refractive layer further comprises third projections having a different height than that of the first projections and the second projections, and wherein each of the first, second and third projections has a flat top surface.

12. The optical film according to claim 11, wherein the third projections include lateral sides including first, second, and third sides having different angles of inclination that decrease in the first direction.

13. The optical film according to claim 1, wherein the second refractive layer has a thickness of about 7 µm to about 16 µm.

14. The optical film according to claim 1, wherein the first refractive layer comprises a base area including the lower surface, which is substantially flat.

15. A method of manufacturing an optical film from a rotatable member and a molding member, the method comprising the steps of:

forming a surface of a rolling member using a cutting member;

forming a surface of the molding member by moving and rotating the rolling member in a preset direction; and forming an optical member into a first refractive layer by compressing the molding member against the optical member to form a plurality of embossed patterns having a first pattern and a second pattern with different heights, wherein the first refractive layer is formed to have an upper surface and a lower surface including first projections and second projections extending away from the lower surface in a first direction, the second projections having different heights than the first projections, the first projections having lateral sides with different angles of inclination that decrease in the first direction away from the lower surface in which the lateral sides further from the lower surface have a lower angle of inclination than the lateral sides closer to the lower surface, in which a top surface of each of the first projections is a flat horizontal surface that has no inclination, wherein the first pattern and the second pattern form a first lens pattern and a second lens pattern, respectively, each of which extends in a second direction different from the first direction on a plane, wherein the first lens pattern extending in the second direction and the second lens pattern extending in the second direction are alternately arranged in a third direction crossing the second direction, the third direction different from the first direction, wherein the first lens pattern and the second lens pattern each further extends in the third direction on a plane, and the first lens pattern extending in the third direction and the second lens pattern extending in the third direction are alternately arranged in the second direction, and wherein the first lens pattern extending in the second direction, the second lens pattern extending in the second direction, the first lens pattern extending in the third direction, and the second lens pattern extending in the third direction are disposed in a same layer as each other in the first refractive layer.

16. The method according to claim 15, wherein the cutting member comprises a diamond cutting portion.

17. The method according to claim 15, further comprising the steps of:

forming a second refractive layer having a refractive index different from that of the first refractive layer on the first refractive layer, and forming a cover film comprising a polyethylene terephthalate on the second refractive layer.

18. A display device, comprising:

a display panel having a display surface; and an optical film comprising a first refractive layer disposed on the display surface, and a second refractive layer disposed on the first refractive layer and having a refractive index different from that of the first refractive layer, wherein the first refractive layer has an upper surface and a lower surface including first projections and second projections extending away from the lower surface in a first direction, the second projections having different heights than the first projections, the first projections having lateral sides with different angles of inclination that decrease in the first direction away from the lower surface in which the lateral sides further from the lower surface have a lower angle of inclination than the lateral sides closer to the lower surface, and wherein a top surface of each of the first projections is a flat horizontal surface that has no inclination, wherein the first projections and the second projections form a first lens pattern and a second lens pattern, respectively, each of which extends in a second direction different from the first direction on a plane, wherein the first lens pattern extending in the second direction and the second lens pattern extending in the second direction are alternately arranged in a third direction crossing the second direction, the third direction different from the first direction, wherein the first lens pattern extending in the third direction and the second lens pattern extending in the third direction each further extends in the third direction on a plane, and the first lens pattern and the second lens pattern are alternately arranged in the second direction, and wherein the first lens pattern extending in the second direction, the second lens pattern extending in the second direction, the first lens pattern extending in the third direction, and the second lens pattern extending in the third direction are disposed in a same layer as each other in the first refractive layer.

19. The display device according to claim 18, wherein the display panel is configured to emit light traveling in one direction from the first refractive layer to the second refractive layer and to refract light from a surface of each of the first refractive layer and the second refractive layer.

20. The display device according to claim 18, wherein the display device has a front contrast ratio of at least about 1800.

21. The display device according to claim 18, wherein the display device has a 60° viewing-angle gamma distortion index of no more than about 0.150.

22. The display device according to claim 18, wherein the display panel comprises one of a self-emission element and a quantum dot.

* * * * *